(12) United States Patent
Ratzloff

(10) Patent No.: US 7,813,948 B2
(45) Date of Patent: Oct. 12, 2010

(54) COMPUTER-IMPLEMENTED SYSTEMS AND METHODS FOR REDUCING COST FLOW MODELS

(75) Inventor: John Phillip Ratzloff, Apex, NC (US)

(73) Assignee: SAS Institute Inc., Cary, NC (US)

( * ) Notice: Subject to any disclaimer, the term of this patent is extended or adjusted under 35 U.S.C. 154(b) by 1005 days.

(21) Appl. No.: 11/510,527

(22) Filed: Aug. 25, 2006

(65) Prior Publication Data

US 2008/0065435 A1    Mar. 13, 2008

(51) Int. Cl.
*G06F 17/60* (2006.01)
(52) U.S. Cl. .......................................................... 705/7
(58) Field of Classification Search ................ 705/7; 707/600, 607
See application file for complete search history.

(56) References Cited

U.S. PATENT DOCUMENTS

| | | | |
|---|---|---|---|
| 5,627,973 | A | 5/1997 | Armstrong et al. |
| 5,652,842 | A | 7/1997 | Siegrist et al. |
| 5,790,847 | A | 8/1998 | Fisk et al. |
| 5,799,286 | A | 8/1998 | Morgan et al. |
| 5,963,910 | A | 10/1999 | Ulwick |
| 5,970,476 | A | 10/1999 | Fahey |
| 6,009,407 | A | 12/1999 | Garg |
| 6,014,640 | A | 1/2000 | Bent |
| 6,029,139 | A | 2/2000 | Cunningham et al. |
| 6,032,123 | A | 2/2000 | Jameson |
| 6,078,892 | A | 6/2000 | Anderson et al. |
| 6,115,691 | A | 9/2000 | Ulwick |
| 6,236,977 | B1 | 5/2001 | Verba et al. |
| 6,237,138 | B1 | 5/2001 | Hameluck et al. |
| 6,275,812 | B1 | 8/2001 | Haq et al. |
| 6,286,005 | B1 | 9/2001 | Cannon |
| 6,321,206 | B1 | 11/2001 | Honarvar |
| 6,330,552 | B1 | 12/2001 | Farrar et al. |
| 6,490,569 | B1 | 12/2002 | Grune et al. |
| 6,502,077 | B1 | 12/2002 | Speicher |
| 6,526,526 | B1 | 2/2003 | Dong et al. |
| 6,584,447 | B1 | 6/2003 | Fox et al. |
| 6,611,829 | B1 | 8/2003 | Tate et al. |
| 6,640,215 | B1 | 10/2003 | Galperin et al. |

(Continued)

FOREIGN PATENT DOCUMENTS

WO        0111522        2/2001

OTHER PUBLICATIONS

Balintfy, Joseph L. et al., "Binary and Chain Comparisons with an Experimental Linear Programming Food Price Index", The Review of Economics and Statistics, vol. 52, No. 3, Aug. 1970, pp. 324-330 [JSTOR].

(Continued)

*Primary Examiner*—Romain Jeanty
(74) *Attorney, Agent, or Firm*—Jones Day

(57) ABSTRACT

Computer-implemented methods and systems for use in analyzing costs associated with cost flow models having components of relationships and entities. Reduction criteria is received for use in reducing number of components that are in a first cost flow model. The reduction criteria is used to generate a reduced cost flow model. The reduced cost flow model has less components than the number of components that are in the received first cost flow model.

24 Claims, 34 Drawing Sheets

U.S. PATENT DOCUMENTS

| | | | |
|---|---|---|---|
| 6,735,570 B1 | 5/2004 | Lacy et al. | |
| 6,901,406 B2 | 5/2005 | Nabe et al. | |
| 6,907,382 B2 | 6/2005 | Urokohara | |
| 6,965,867 B1 | 11/2005 | Jameson | |
| 6,970,830 B1 | 11/2005 | Samra et al. | |
| 7,003,470 B1 | 2/2006 | Baker et al. | |
| 7,177,850 B2 | 2/2007 | Argenton et al. | |
| 7,240,019 B2* | 7/2007 | Delurgio et al. | 705/10 |
| 7,249,033 B1* | 7/2007 | Close et al. | 705/1 |
| 7,308,414 B2 | 12/2007 | Parker et al. | |
| 7,376,647 B1 | 5/2008 | Guyan et al. | |
| 7,412,413 B2* | 8/2008 | James | 705/35 |
| 7,565,300 B2* | 7/2009 | Hunt et al. | 705/2 |
| 7,617,119 B1* | 11/2009 | Neal et al. | 705/10 |
| 2001/0014868 A1 | 8/2001 | Herz et al. | |
| 2002/0013757 A1 | 1/2002 | Bykowsky et al. | |
| 2002/0016752 A1 | 2/2002 | Suh | |
| 2002/0046078 A1 | 4/2002 | Mundell et al. | |
| 2002/0046096 A1 | 4/2002 | Srinivasan et al. | |
| 2002/0072953 A1 | 6/2002 | Michlowitz et al. | |
| 2002/0091909 A1 | 7/2002 | Nakanishi | |
| 2002/0107723 A1 | 8/2002 | Benjamin et al. | |
| 2002/0109715 A1 | 8/2002 | Janson | |
| 2002/0116237 A1 | 8/2002 | Cohen et al. | |
| 2002/0123930 A1 | 9/2002 | Boyd et al. | |
| 2002/0123945 A1 | 9/2002 | Booth et al. | |
| 2002/0147668 A1 | 10/2002 | Smith et al. | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0018503 A1 | 1/2003 | Shulman | |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0120651 A1 | 6/2003 | Bernstein et al. | |
| 2003/0126010 A1 | 7/2003 | Barns-Slavin | |
| 2003/0149613 A1 | 8/2003 | Cohen et al. | |
| 2003/0182387 A1 | 9/2003 | Geshwind | |
| 2003/0208402 A1 | 11/2003 | Bibelnieks et al. | |
| 2003/0208420 A1 | 11/2003 | Kansal | |
| 2003/0220906 A1 | 11/2003 | Chickering | |
| 2003/0225660 A1 | 12/2003 | Noser et al. | |
| 2003/0236721 A1 | 12/2003 | Plumer et al. | |
| 2004/0073496 A1 | 4/2004 | Cohen | |
| 2005/0131802 A1 | 6/2005 | Glodjo | |
| 2005/0171918 A1 | 8/2005 | Eden et al. | |
| 2005/0187917 A1 | 8/2005 | Lawande et al. | |
| 2005/0192876 A1 | 9/2005 | McKee, Jr. | |
| 2006/0136098 A1 | 6/2006 | Chitrapura et al. | |
| 2006/0143042 A1 | 6/2006 | Gragg et al. | |
| 2006/0161637 A1 | 7/2006 | Friess et al. | |
| 2006/0253403 A1 | 11/2006 | Stacklin et al. | |
| 2007/0226090 A1 | 9/2007 | Stratton | |
| 2008/0065435 A1 | 3/2008 | Ratzloff | |

OTHER PUBLICATIONS

Beamon, Benita M., "Supply chain design and analysis: Models and methods", International Journal of Production Economics, Apr. 15, 1998, pp. 281-294.

Cohen, Marc-david et al., "SAS/OR® Optimization Procedures, with Applications to the Oil Industry," SUGI Proceedings, 1994 (pp. 1-9).

Cokins, Gary et al., "An ABC Manager's Primer Straight Talk on Activity-Based Costing", Institute of Management Accountants, Mar. 9, 1993, pp. 1-40, 63-64.

Cook, Wade D. et al., "Evaluating Suppliers of Complex Systems: A Multiple Criteria Approach", The Journal of the Operational Research Society, vol. 43, No. 11, Nov. 1992 (pp. 1055-1061).

Hollander, Geoffrey, "Modell deftly parses customer characteristics", InfoWorld, May 25, 1998, vol. 20, No. 21, pp. 1-4, retrieved from: Dialog, file 148.

Horngren, Charles T. et al., "Cost Accounting A Managerial Emphasis", Tenth Edition, Chapter 14, pp. 497-534, 2000.

Johnson, Ellis L. et al., "Recent Developments and Future Directions in Mathematical Programming", IBM Systems Journal, vol. 31, No. 1, 1992, pp. 79-93 [DIALOG: file 15].

Lee, Eon-Kyung et al., "An effective supplier development methodology for enhancing supply chain performance," ICMIT 2000, pp. 815-820.

Lee, Eon-Kyung et al., "Supplier Selection and Management System Considering Relationships in Supply Chain Management", IEEE Transactions on Engineering Management, vol. 48, No. 3, Aug. 2001, pp. 307-318.

Kearney, Trevor D., "Advances in Mathematical Programming and Optimization in the SAS System," SUGI Proceedings, 1999 (12 pp.).

Manchanda, Puneet et al., "The 'Shopping Basket': A Model for Multi-category Purchase Incidence Decisions", Marketing Science, vol. 18, No. 2, 1999, pp. 95-114 [JSTOR].

Medaglia, Andres L., "Simulation Optimization Using Soft Computing", dissertation for Operations Research Department at North Carolina State University, Jan. 24, 2001 (2 pp.).

Porter-Kuchay, Suzanne, "Multidimensional Marketing", Target Marketing, Jan. 2000 [DIALOG: file 13].

Rosen, Michele, "There's Gold in That There Data", Insurance & Technology, Dec. 1998, vol. 23, No. 12, pp. 1-6, retrieved from: Dialog, file 16.

Saarenvirta, Gary, "Data Mining to Improve Profitability", CMA Magazine, vol. 72, No. 2, Mar. 1998, pp. 8-12 [DIALOG: file 15].

Samudhram, Ananda, "Solver setting for optimal solutions", New Strait Times, Nov. 22, 1999 (3 pp.).

Spiegelman, Lisa L., "Optimizers Assist in Specialized Marketing Efforts", Computer Reseller News, Nov. 22, 1999 [PROQUEST].

Data Mining News, Looking Past Automation, MarketSwitch Focuses on Optimization of Marketing Campaigns, Data Mining News, May 10, 1999 [GOOGLE].

Modell by Group 1 Software, www.g1.com, Aug. 29, 1999 [retrieved Dec. 21, 2005], pp. 1-16, retrieved from: Google.com and archive. org.

SAS Institute Inc., Data Mining, www.sas.com, Jan. 29, 1998 [retrieved Dec. 22, 2005], pp. 1-28, retrieved from: Google.com and archive.org.

"i2 Technologies: i2 releases i2 Five.Two-The complete platform for dynamic value chain management; Flexible, intuitive, powerful solutions designed to help companies gain efficiencies and drive revenue", M2 Presswire, Oct. 25, 2001 (4 pp.).

"Perfect and Open Ratings Form Alliance to Provide Critical Supplier Performance Ratings to Private Exchanges and Net Markets", Business Wire, Oct. 30, 2000 (3 pp.).

"Unica Releases Model 1 Enterprise Edition", Business Wire, Oct. 29, 1998 [retrieved Dec. 22, 2005, pp. 1-3, retrieved from: Proquest Direct.

Chen et al., U.S. Appl. No. 11/211,353, filed Aug. 25, 2005 entitled "Financial Risk Mitigation Optimization Systems and Methods".

Stratton, Alan J., U.S. Appl. No. 11/370,371, filed Mar. 8, 2006 entitled "Systems and Methods for Costing Reciprocal Relationships".

Gilbert, John R. et al., "Sparse Matrices in Matlab: Design and Implementation", SIAM Journal on Matrix Analysis and Applications, pp. 1-24 (1991).

* cited by examiner

Model: 1000 Parcel Express
Per/Sc: 07/01 2004 Q1/Actual

Filters | MSC Output

Stages
○ Modules
⊙ Stages Dimension                    [Defaults]

⊞-☑ (1047) (In) Stage 1 Resources
⊞-☑ (1048) (Out) Stage 2 Customer Service
⊞-☑ (1049) (Out) Stage 3 Parcel Handling
⊞-☑ (1050) (Out) Stage 4 Parcel Delivery
⊞-☑ (1051) (Out) Stage 5 Final

⊞-☐ (1047) (In) Stage 1 Resources
⊞-☑ (1048) (Out) Stage 2 Customer Service
⊞-☑ (1049) (Out) Stage 3 Parcel Handling
⊞-☑ (1050) (Out) Stage 4 Parcel Delivery
⊞-☑ (1051) (Out) Stage 5 Final

⊞-☐ (1047) (In) Stage 1 Resources
⊞-☑ (1048) (Out) Stage 2 Customer Service
⊞-☑ (1049) (Out) Stage 3 Parcel Handling
⊞-☑ (1050) (Out) Stage 4 Parcel Delivery
⊞-☐ (1051) (Out) Stage 5 Final

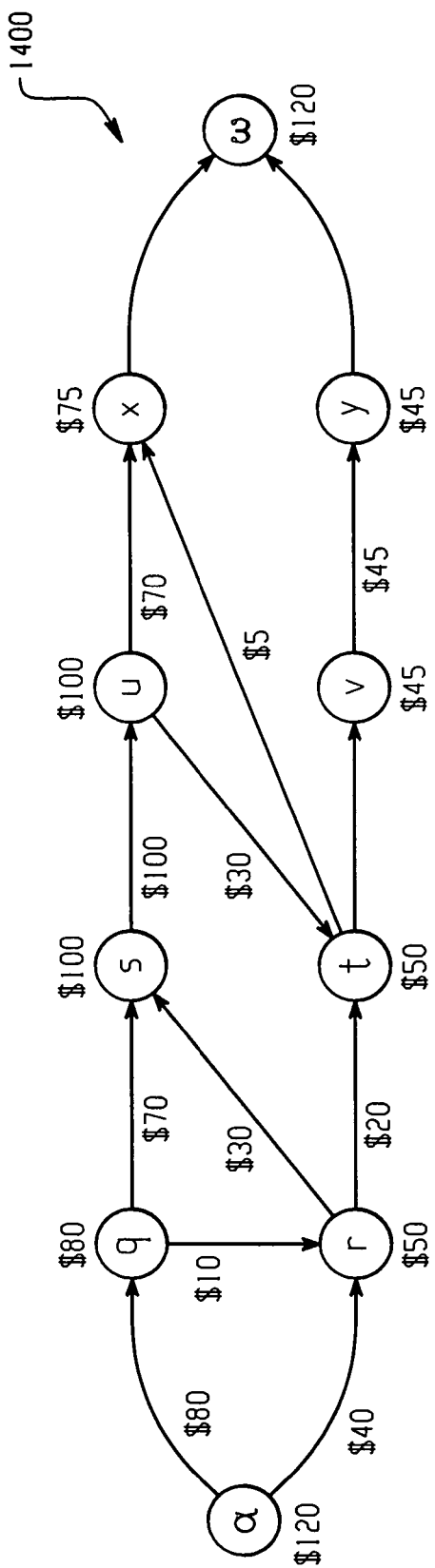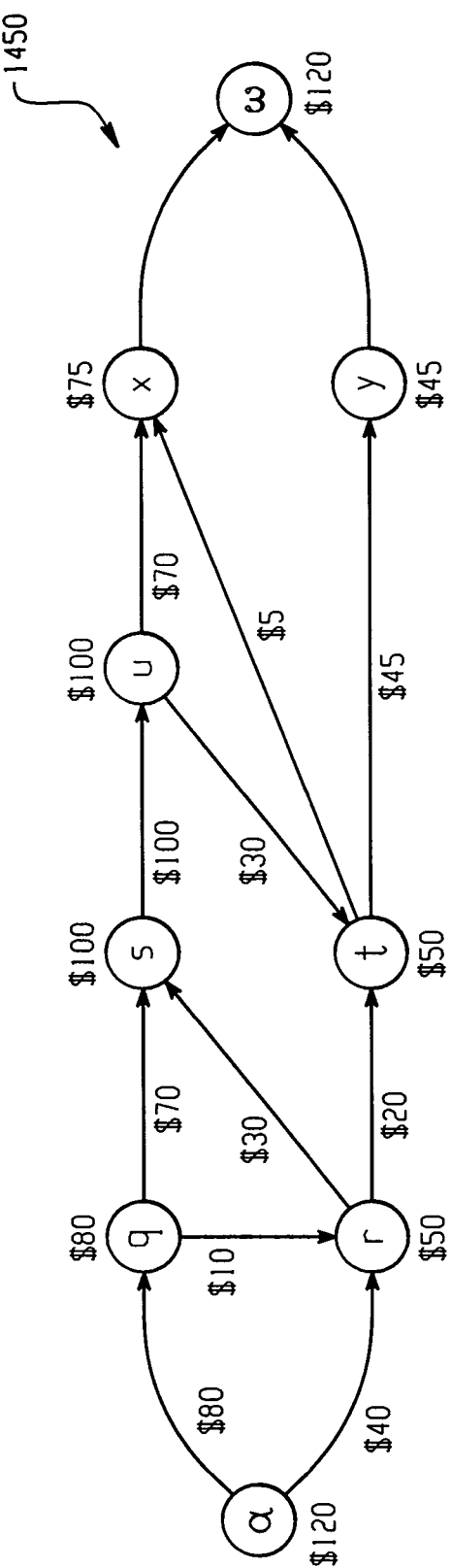
Fig. 19
Fig. 20

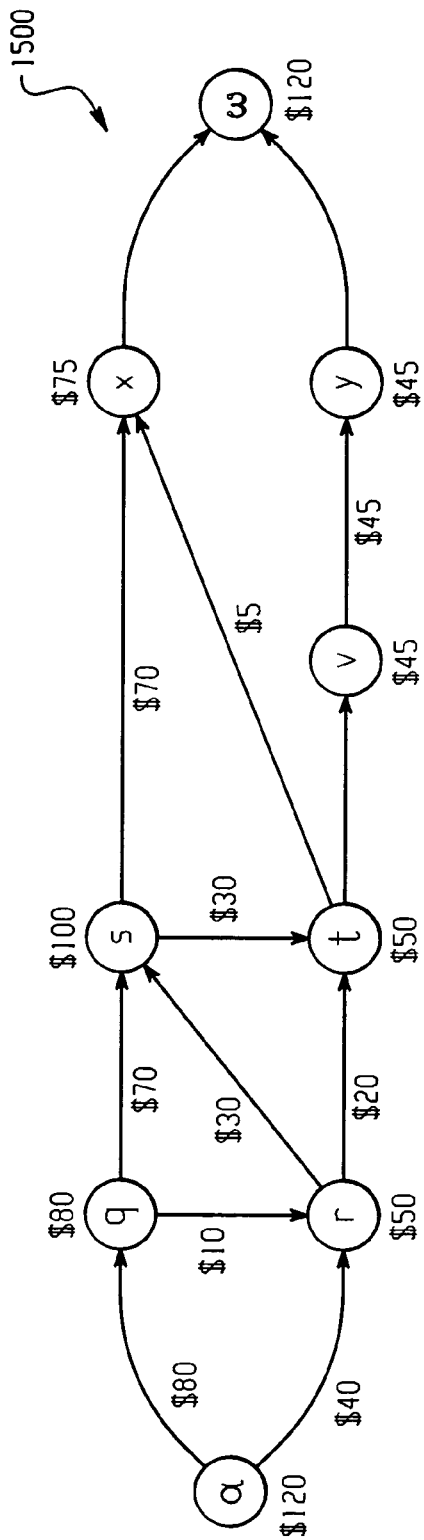
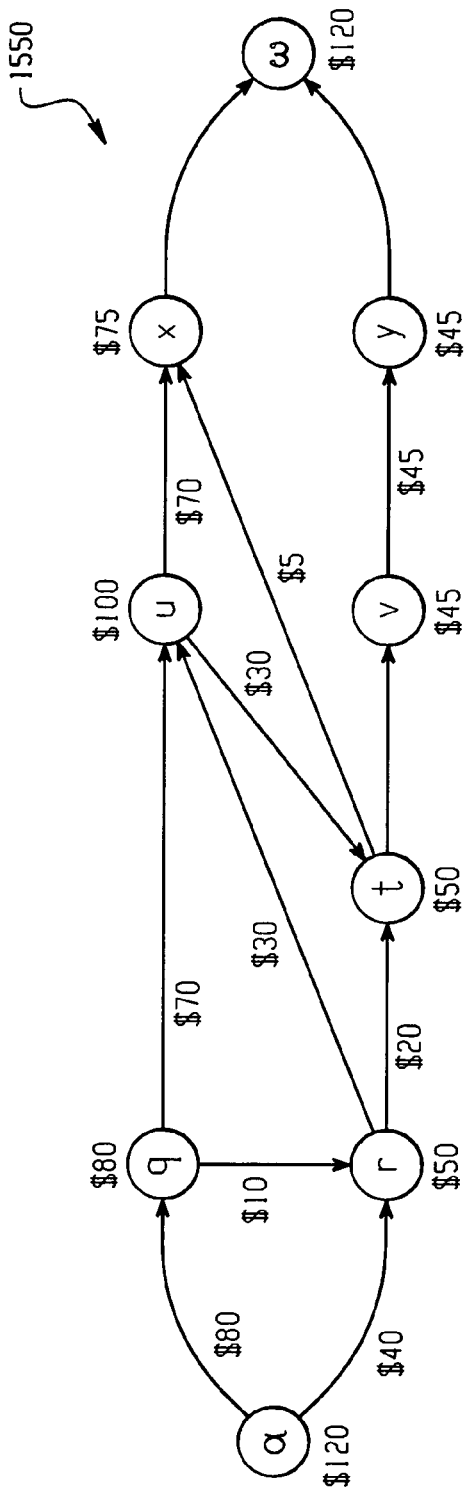
Fig. 21
Fig. 22

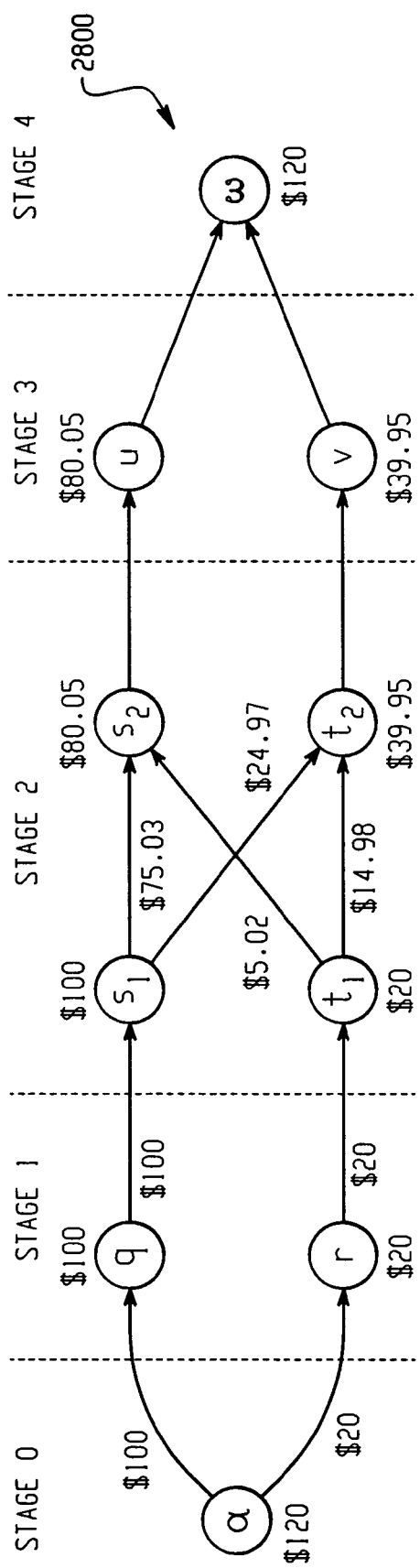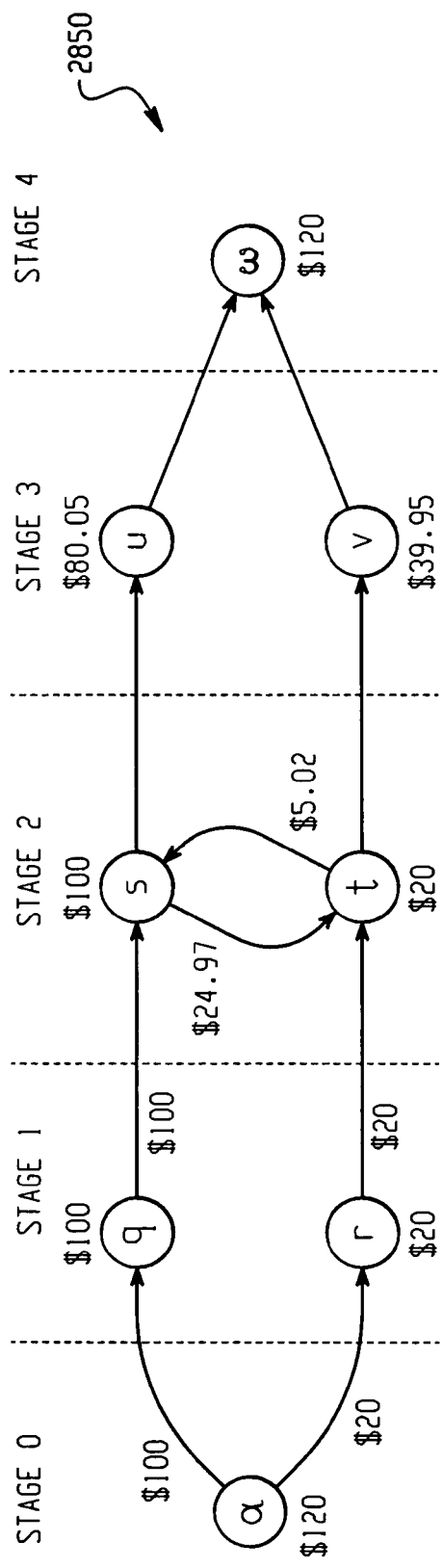
Fig. 47
Fig. 48

| | A | B | C | D | E | F | G | H |
|---|---|---|---|---|---|---|---|---|
| 1 | | | | | | | | |
| 2 | | All Period | 2004 ▼ | | | | | |
| 3 | | All Scenario | Actual ▼ | | | | | |
| 4 | | | | | | | | |
| 5 | | Cost | | | | | | |
| 6 | | | | All_Region ▼ | Level_One | Level2 | | All Total |
| 7 | | | | All | | | | |
| 8 | | All_Activities ▼ | Level1 | None | USA | | USA Total | |
| 9 | | All | Expedite Shipping | 148549.7571 | California | Oregon | | 148549.7571 |
| 10 | | | None | -45 | 2709659.35 | 1193421.6 | 3903080.95 | 3903035.95 |
| 11 | | | Resolve Customer Complaints | 184811.3929 | | | | 184811.3929 |
| 12 | | All Total | | 333316.15 | 2709659.35 | 1193421.6 | 3903080.95 | 4236397.1 |
| 13 | | | | | | | | |
| 14 | | Pivot Table Field List ▼ ☒ | | | | | | |
| 15 | | | | | | | | |
| 16 | | Drag items to the Pivot Table report | | | | | | |
| 17 | | | | | | | | |
| 18 | | ⊞ ☐ All Period | | | | | | |
| 19 | | ⊞ ☐ All Scenario | | | | | | |
| 20 | | ⊟ ☐ Stage_2_Customer_ServiceActivity | | | | | | |
| 21 | | ⋮ All_Activities | | | | | | |
| 22 | | ⋮ Level1 | | | | | | |
| 23 | | ⊞ ☐ Stage_2_Customer_ServiceCustomer Va | | | | | | |
| 24 | | ⊞ ☐ Stage_2_Customer_ServiceImportance | | | | | | |
| 25 | | ⊞ ☐ Stage_2_Customer_ServiceOrganization | | | | | | |
| 26 | | ⊞ ☐ Stage_2_Customer_ServiceRegion | | | | | | |
| 27 | | ⊞ ☐ Stage_3_Parcel HandlingActivities | | | | | | |
| 28 | | | | | | | | |
| 29 | | Add To | Row Area | | | | | |
| 30 | | | | | | | | |
| 31 | | | | | | | | |

COMPUTER-IMPLEMENTED SYSTEMS AND METHODS FOR REDUCING COST FLOW MODELS

CROSS-REFERENCE TO RELATED APPLICATION

This application contains subject matter that may be considered related to subject matter disclosed in U.S. patent application Ser. No. 11/370,371 (filed Mar. 8, 2006, entitled "Systems And Methods For Costing Reciprocal Relationships"), of which the entire disclosure (including any and all figures) is incorporated herein by reference.

TECHNICAL FIELD

This document is generally directed to computer-implemented cost analysis, and more particularly to computer-implemented cost analysis that use cost flow models.

BACKGROUND

A cost flow model, such as an Activity-Based Costing (ABC or ABM) model, is a multi-dimensional directed graph. It depicts how money flows in an enterprise. The nodes in the graph represent the resource, activity, or cost object accounts. The edges in the graph have a percentage on them, which defines how much money flows from a source account to a destination account. This graph can easily have hundreds of thousands of accounts and millions of edges.

People want to know, not just how much money flowed to an account, but how much money account A contributed to account B. If there are 100 accounts of type A and 100 accounts of type B, there are 10,000 possibilities of contribution from accounts of type A to accounts of type B. Situations could even include over a quadrillion ($1 \times 10^{15}$) possibilities. It is impossible or impractical to write out all the values. A further restriction might arise in some situations that the reporting tools available are based on table structures that require the graph to be forced into a regular structure so that it can be used by existing reporting and database tools, such as relational database management systems (RDBMS), multi-dimensional database systems (MDDB) (e.g., Online Analytical Processing (OLAP) tools), etc.

SUMMARY

In accordance with the teachings disclosed herein, computer-implemented methods and systems are provided for use in analyzing costs associated with cost flow models having components of relationships and entities. For example, a method and system can include receiving data associated with a first cost flow model that identifies the costs associated with the relationships among the entities. Reduction criteria is received for use in reducing number of components that are in the first cost flow model. The reduction criteria is used to generate a reduced cost flow model. The reduced cost flow model has fewer components than the number of components that are in the received first cost flow model. The reduced cost flow model is for use in analyzing costs associated with the entities in the reduced cost flow model.

BRIEF DESCRIPTION OF THE DRAWINGS

FIGS. 9 and 10 are graphical user interfaces for specifying cost flow model graph reduction criteria.

FIGS. 12-14 are graphical user interfaces for specifying cost flow model graph reduction criteria.

FIGS. 19-50 are cost flow model graphs for use as examples in how various model reductions can be performed.

FIG. 51 depicts a sample view of an OLAP cube that was created from a fact table generated from a reduced graph.

DETAILED DESCRIPTION

Figure 1:
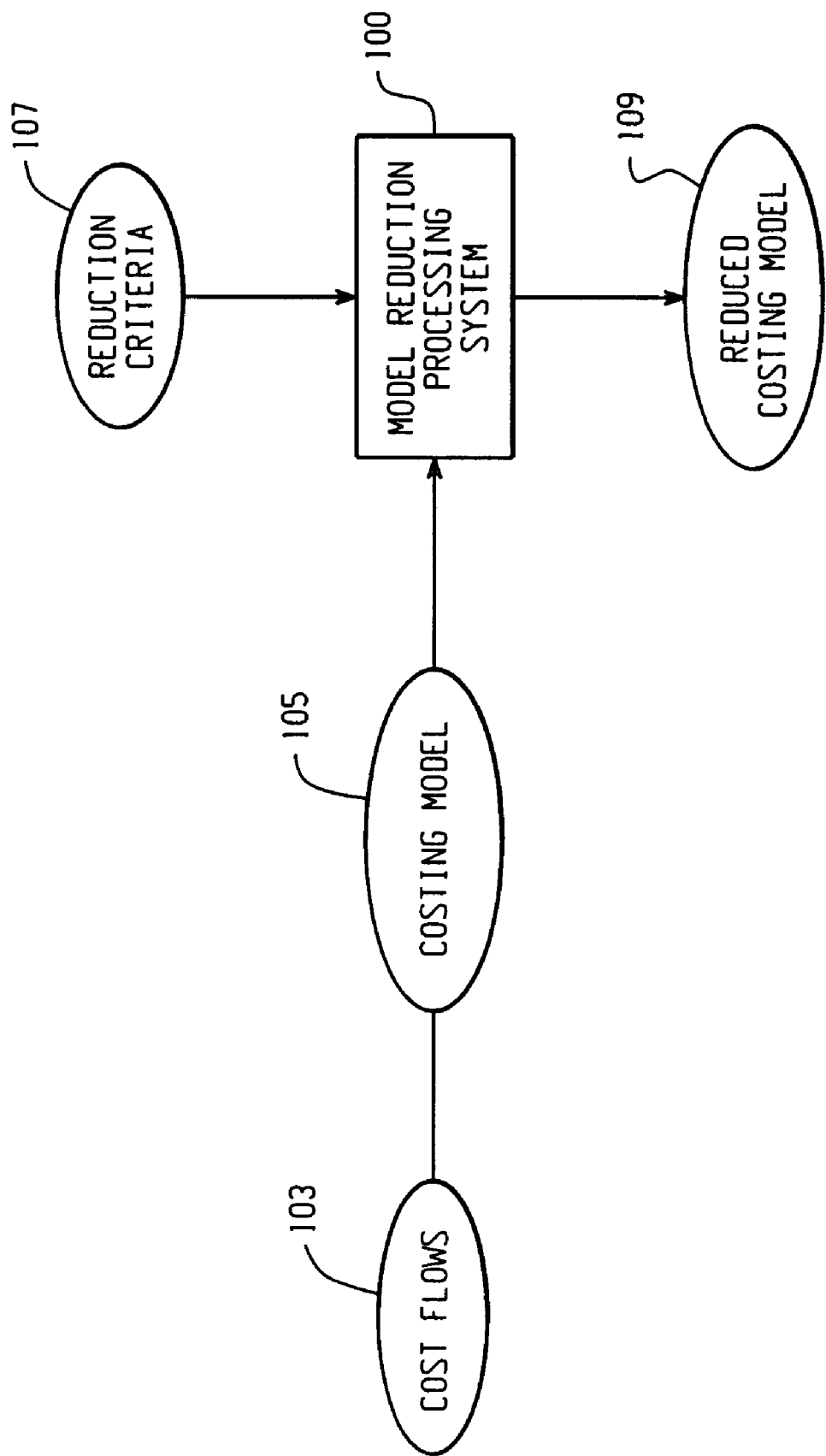
FIG. 1 is a block diagram depicting software and computer components utilized in a model reduction processing system.

FIG. 1 depicts a system at 100 for reducing a costing model 105 by removing and/or merging entities (e.g., accounts) that are contained in the costing model 105. The costing model 105 contains cost flows 103 for depicting how money flows in an enterprise (e.g., how costs flow from one account to another). The model reduction processing system 100 uses reduction criteria 107 to determine how the removal and/or merging of the entities in the costing model 105 is to occur. The reduction results in a costing model 109 that is smaller than the original cost flow model 105 and obviates the need for a user to report on all possible contributions. For example a user can identify the set of accounts they wish to report on, and the accounts the user is not interested in are eliminated.

Figure 2:
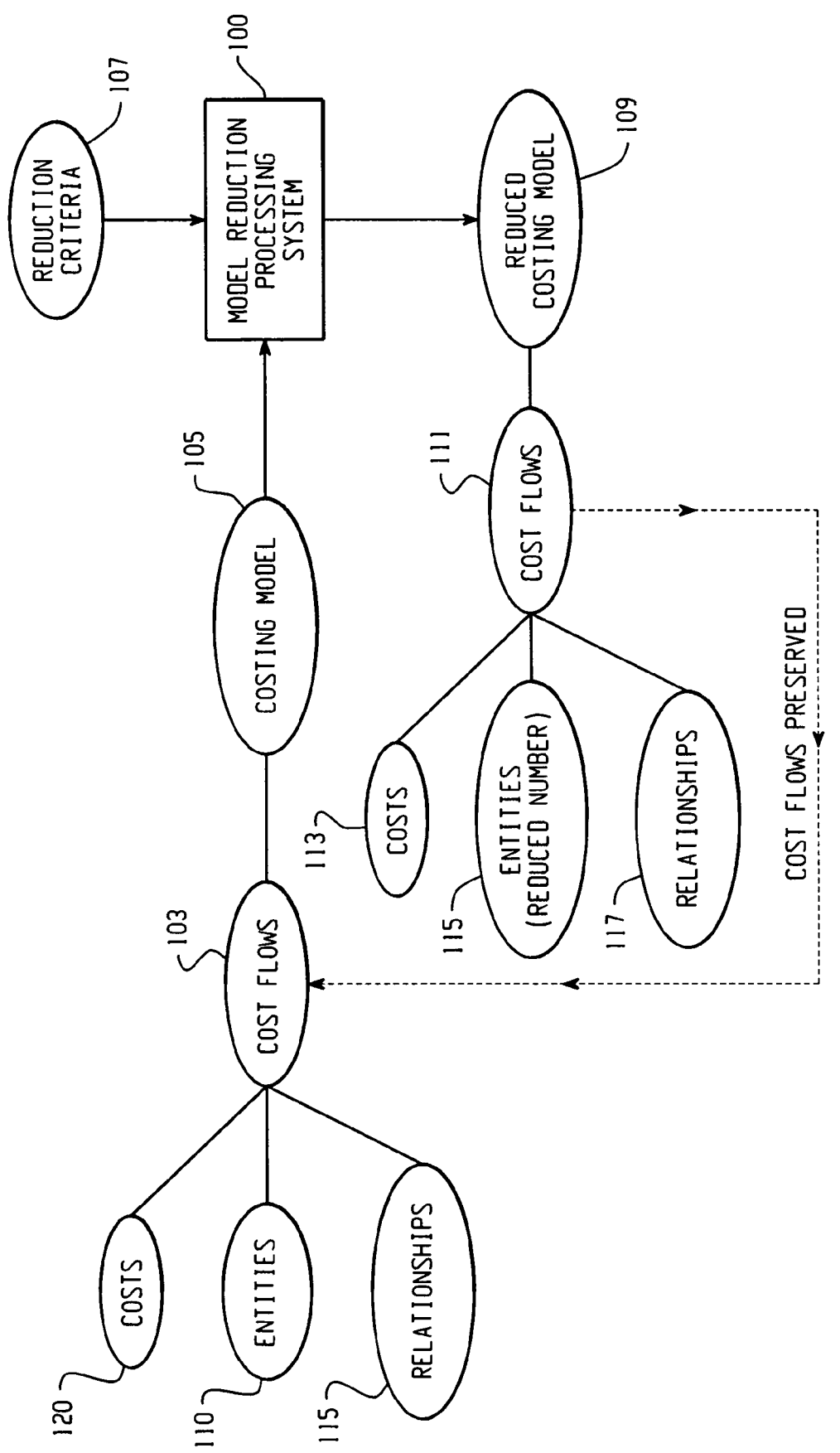
FIG. 2 is a block diagram depicting cost flow preservation.

FIG. 2 depicts the model reduction processing system 100 including a costing model 105 that allocates costs (e.g., expenses, profits, budgets, capital, assets, property, etc.) to various entities (e.g., accounts, cost pools, etc.) that comprise a concern (e.g., a business). The costing model 105 can accomplish this by specifying entity data 110, relationship data 115, and cost data 120.

Entity data 110 can represent any number of entities, including, but not limited to, cost pools such as activity-based cost pools, accounts, process-based cost pools, and other logical groupings of money. Relationship data 115 includes information regarding the relationships between entities, such as which direction is the cost flow from a first account to a second account. Cost data 120 can represent the money allocated (or to be allocated) to a particular cost pool. It should be understood that the term cost is used broadly to cover a range of possible uses of money and/or other property. For example, cost data 120 can in some instances refer to budgeting where an actual expense does not yet exist.

As shown in FIG. 2, model reduction processing result in the cost flows (103, 111) being preserved between the initial costing model 105 and the resulting reduced costing model 109. Preservation of cost flows (103, 111) indicates that the starting cost is the same cost that is at the end of the flow (e.g., the initial or alpha account has the same cost as the final or omega account); and when removing or merging accounts, the cost for the outgoing accounts does not change. The destination accounts obtain their costs from different accounts, but the total cost does not change. Accordingly, despite the number of components (e.g., the number of entities 115) of the reduced costing model 109 being less than the number of components (e.g., the number of entities 110) in the initial costing model 105, the total cost is not altered. It should be understood that a model reduction processing system can be configured to reduce entities 110 and/or other types of graph components, such as relationships 115, when generating the reduced costing model 109.

Figure 3:
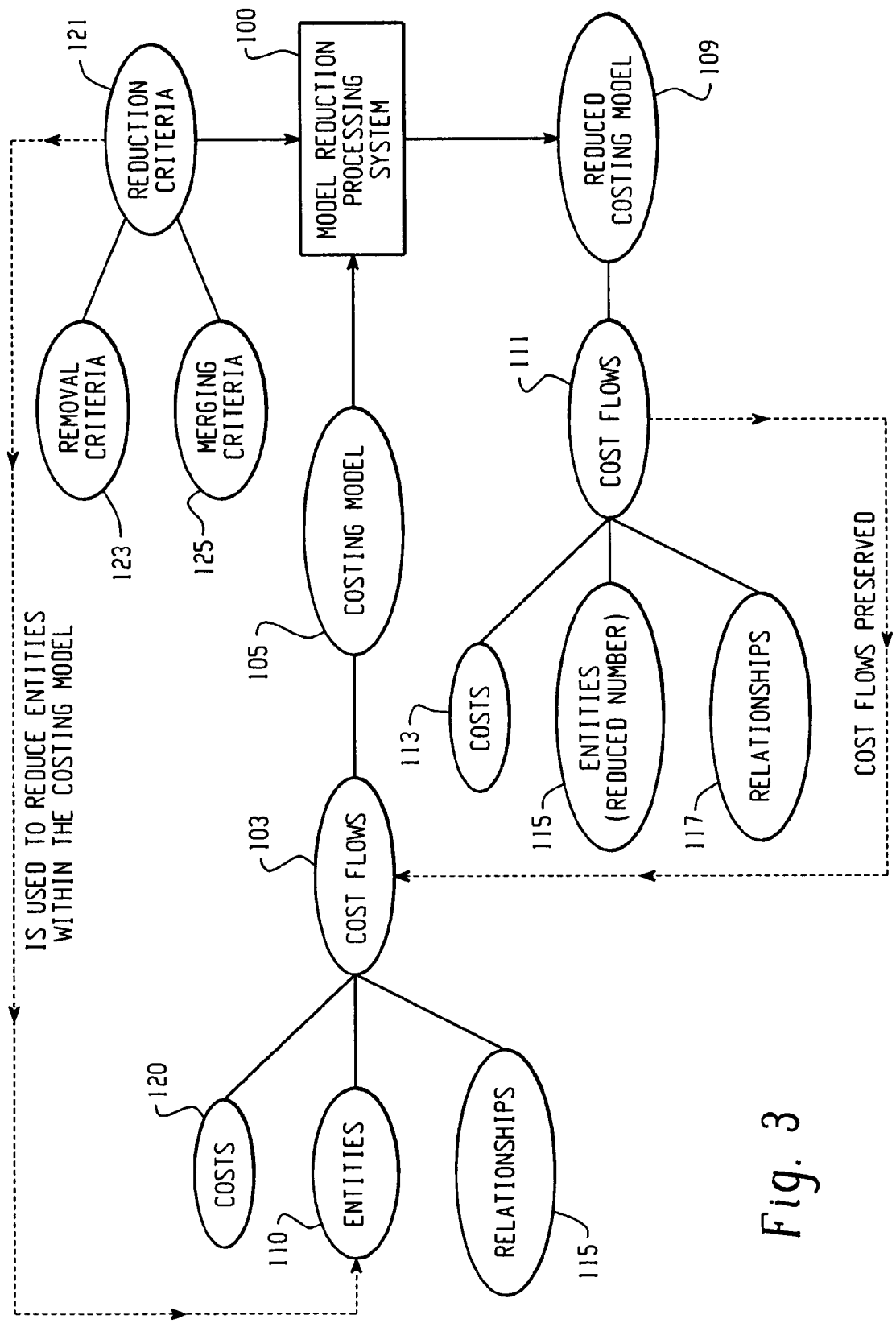
FIG. 3 is a block diagram depicting use of reduction criteria in reducing entities within a costing model.

FIG. 3 depicts that the reduction criteria 121 can include one or more different types of criteria, such as removal criteria 123, merging criteria 125, etc. A user can specify the reduction criteria 121 or the information can be provided by another software application.

Figure 4:
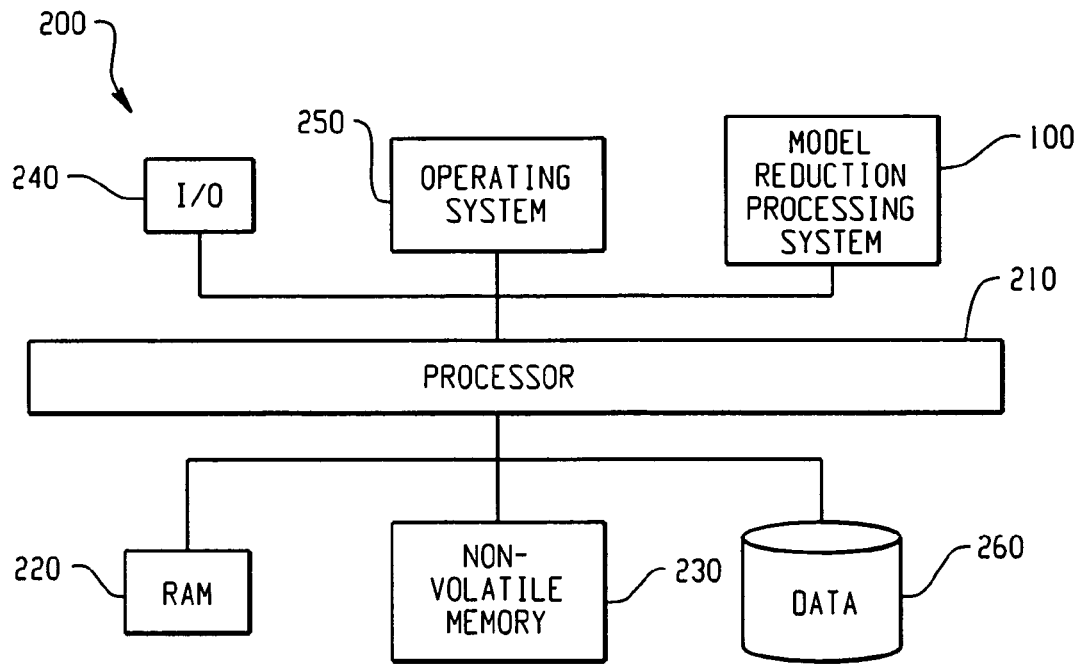
FIG. 4 is a block diagram depicting a computer environment within which a model reduction processing application can be used.

FIG. 4 depicts a block diagram of a computing device 200 that can execute a model reduction method associated with this disclosure. The computing device 200 includes a processor 210 which is configured to execute instructions stored in memory, such as a random access memory (RAM) 220. The instructions can be transferred to the RAM 220 from the non-volatile memory 230 in preparation for execution. It should be understood that the non-volatile memory 230 can further contain other non-instruction data. The processor can communicate with a user, or other program via any supported input/output interfaces 240. Examples of such I/O interfaces can include a monitor, a keyboard, a mouse, and a communication interface to communicate with other computers, among many others. An operating system (O/S) 250 executing on the processor can help to facilitate operation of the computer and execution of any applications residing on the computer system 200. It should be recognized that each of these components of the computing system are readily available in myriad different combinations, and this disclosure is intended to apply equally to all past, present and future computing systems.

The computing system 200 further includes a connection to entity, relationship and cost data stored in a data store 260. A myriad of suitable data stores are commercially available from a variety of vendors. It should be noted that the data store 260 can be co-located with the computing system 200 or remotely located from the computing system 200. The data store can include information about the entities, relationships and costs associated with the entities, such that a costing model can be created from the data. Alternatively, a costing model could be input into the system by a user, and stored in the data store 260. The computing system 200 also includes a model reduction software application 100 which operates in a manner as disclosed herein. It should be understood that many different computer environments may be used, such as the systems and methods disclosed herein being implemented on a single general purpose computer or workstation, or on a networked system, or in a client-server configuration, or in an application service provider configuration.

Figure 5:
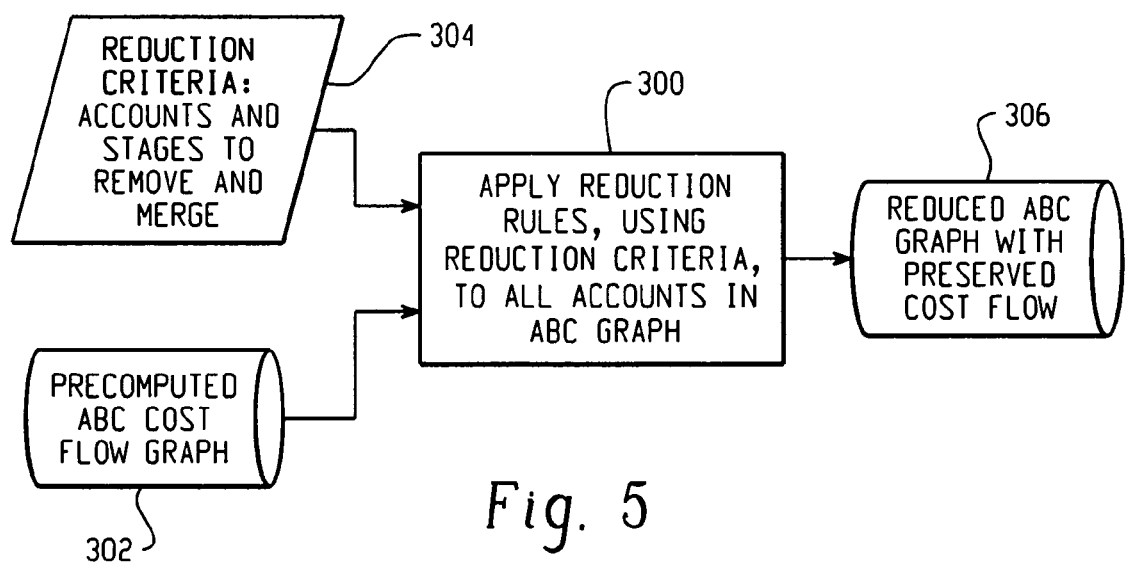
FIG. 5 is a process flow diagram depicting reduction of a costing model.

FIG. 5 depicts a process 300 for reducing a cost flow graph, such as an ABC cost graph 302. The process 300 takes the cost graph 302 and reduction criteria 304 as inputs and outputs a reduced ABC cost graph 306.

Figure 6:
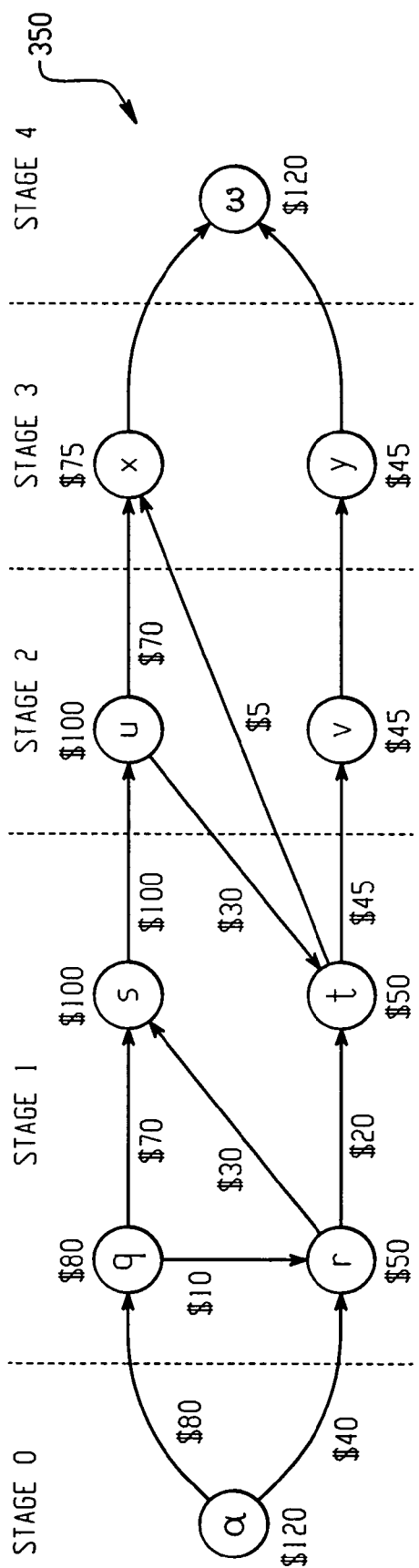
FIG. 6 is a cost flow model graph depicting how money flows in an enterprise.

The input ABC cost graph of FIG. 5 can assume many forms. An example is shown at 350 in FIG. 6. The ABC cost graph of FIG. 6 depicts how money flows in an enterprise, starting from the accounts in the general ledger (generally called resources) to activities, and finally, to products (generally called cost objects). The ABC cost graph of FIG. 6 is a directed flow graph with the following characteristics:

The graph is made up of accounts (which can also be known as nodes or vertices) and assignments (which can also be known as edges or cost elements). Assignments join accounts together and cause cost to flow from one account to another.

Costs are flowed through the graph.

Two system-defined accounts exist: $\alpha$ is the source of the costs, such that it can be reached by recursively visiting any source assignment for any account in the graph. In ABC terms, it is the source of all entered cost elements. $\omega$ is the sink of all costs, such that it can be reached by recursively visiting any destination assignment for any account in the graph.

The sum of all incoming assignment costs equals the sum of all outgoing assignment costs for each account. The exceptions to this are the $\alpha$ and $\omega$ accounts, where a has no incoming assignments and $\omega$ has no outgoing assignments.

$\alpha$ and $\omega$ have the same cost.

Each account can optionally be tagged as being in a single stage, or not in a stage at all. A stage represents the logical, left-to-right flow, through the graph. The stages are separated by vertical dashed lines.

Figure 7:
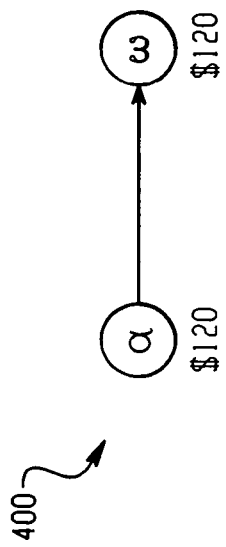
FIG. 7 is a cost flow model graph wherein a single assignment links accounts α and ω.

FIG. 7 shows at 400 a graph wherein a single assignment links accounts $\alpha$ and $\omega$. $\alpha$ and $\omega$ are system-defined. While they are not required, they can help simplify the algorithms by providing well-defined start and terminal accounts that always exist.

With the above description of an ABC graph in mind, an ABC graph can be reduced in many different ways. For example, the reduction criteria 304 (of FIG. 5) can include one or more of the following:

1. Stages to remove.
2. One or more accounts to remove.
3. Sets of accounts to be merged, where each set of accounts will be merged into a single account.

In terms of the accounts to remove or merge, the reduction criteria 304 can specify individual accounts or a set of rules to apply that identifies the set of accounts to remove, or the set of accounts to merge.

Figure 8:
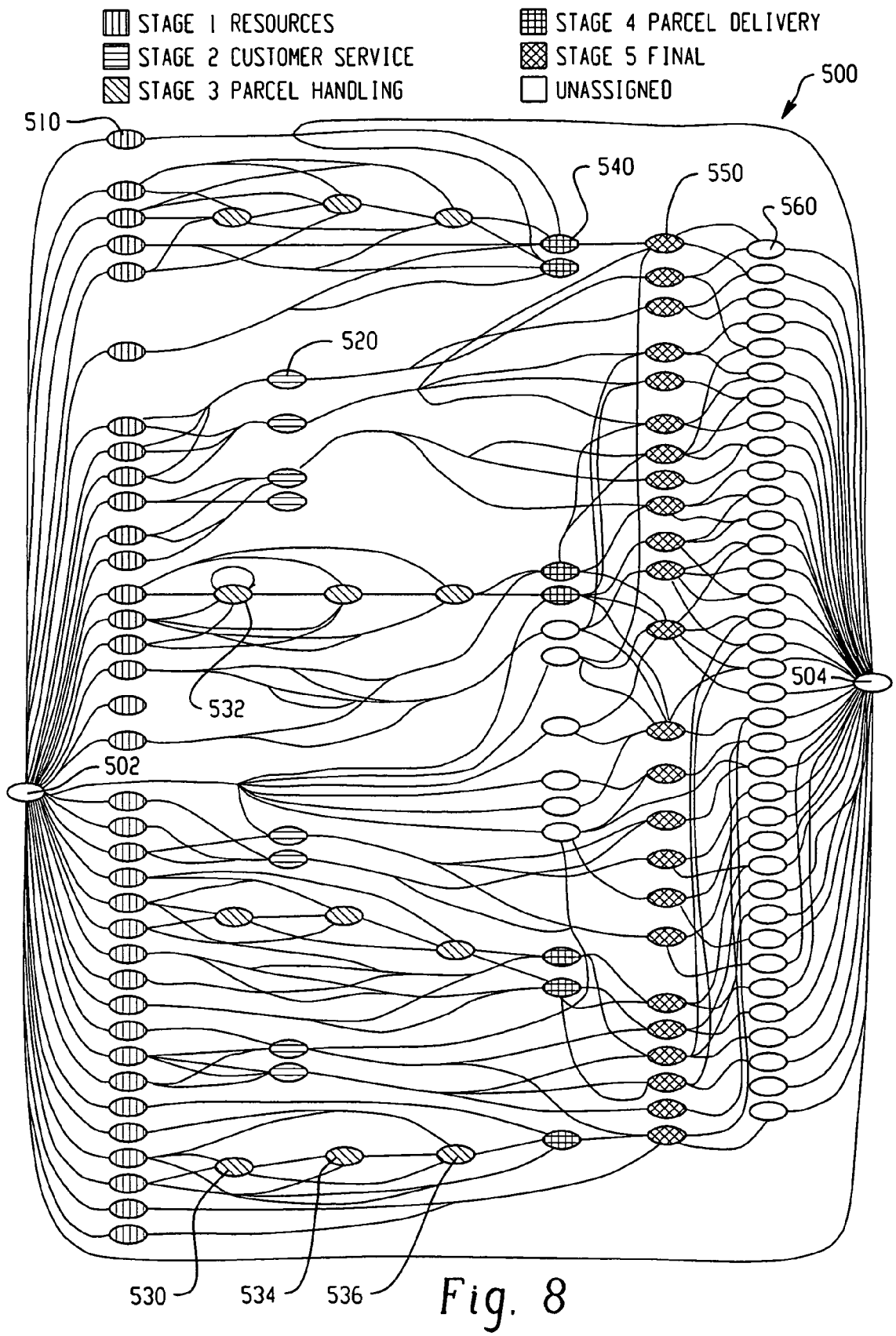
FIG. 8 is a cost flow model graph which is to be reduced.

As an example of reduction criteria 304 being used to reduce a graph, the initial graph shown in FIG. 8 at 500 is to be reduced. The colors used in the graph are as follows:

| Stage | Color |
| --- | --- |
| Stage 1 Resources (e.g., node 510) | Salmon |
| Stage 2 Customer Service (e.g., node 520) | Blue |
| Stage 3 Parcel Handling (e.g., node 530) | Green |
| Stage 4 Parcel Delivery (e.g., node 540) | Yellow |
| Stage 5 Final (e.g., node 550) | Purple |
| Unassigned (e.g., node 560) | White |

$\alpha$ (alpha) at 502 is the left most account and $\omega$ (omega) at 504 is the rightmost account. While they are white, they are in their own stages and remain in the graph after any reduction if desired.

The following observations can be made about the graph:

Each stage is roughly shown in their own columns.

Stages 2 (blue) at 520 and 3 (green) at 530 do not depend on one another and can share the space on the graph, even though they are distinct stages.

Stage 3 (green) at 530 illustrates that accounts in the same path can be in the same stage.

There is also a green account at 532 about half-way down with a red cycle-to-self assignment.

Figure 9:
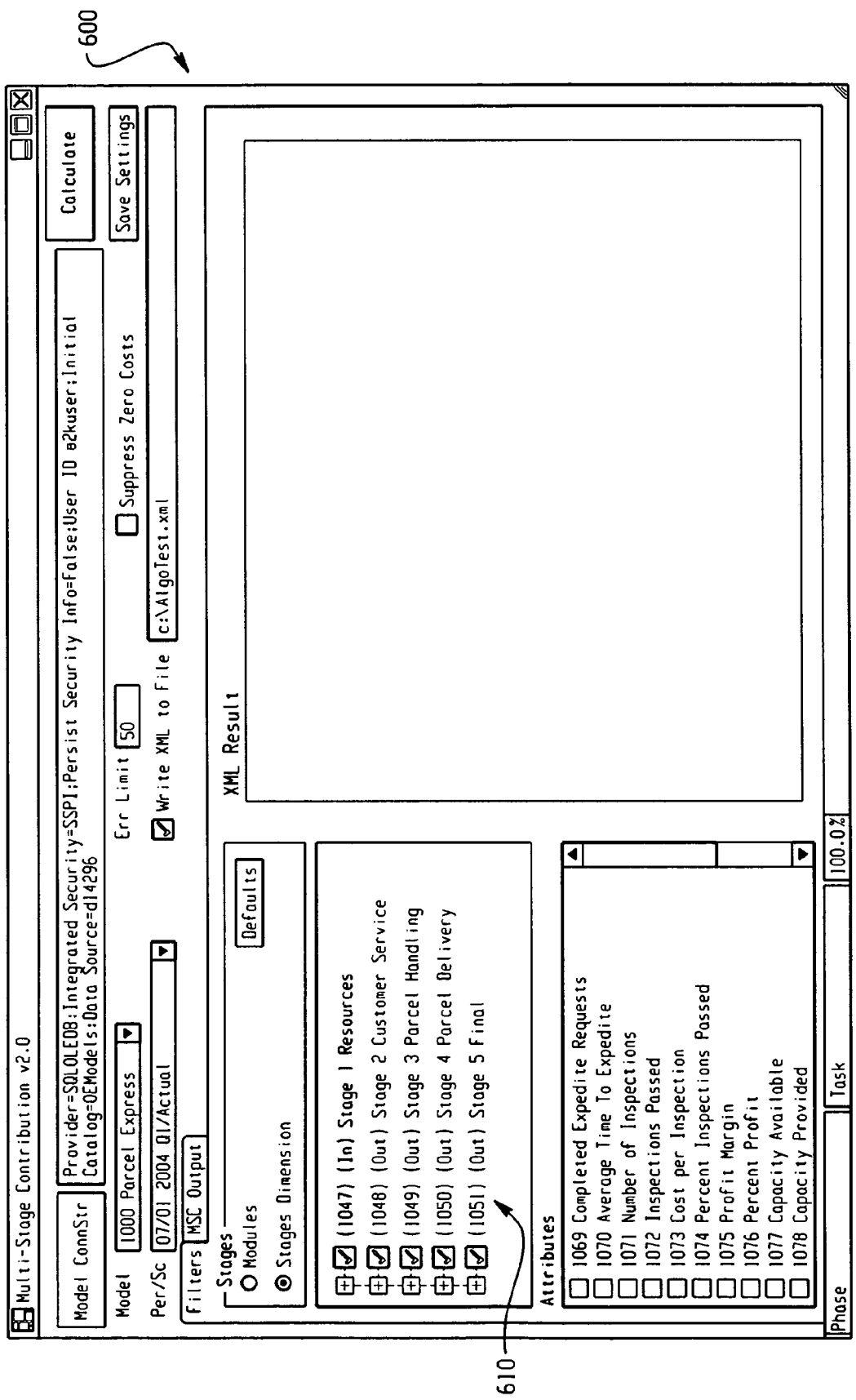

To illustrate stage reduction for this initial graph shown in FIG. 8, FIG. 9 shows a sample user interface 600 that can be used for specifying the reduction criteria. The area to focus in the user interface 600 is region 610 and is depicted in greater detail in FIG. 10. In this region 610 the user specifies the model and period/scenario. Period and scenario are additional dimensions.

It is noted that a dimension in this context is identical to the OLAP concept of dimension, wherein a dimension is made up of dimension members organized in a hierarchical structure. An account exists at the intersection of a number of dimensions. For instance, a cost object account might exist at the intersection of a product (or services) dimension and a customer dimension (e.g., at the intersection of a guns dimension and megamart (customer) division dimension: Guns×Firearms Division).

The following example only deals with a single period/scenario at a time. All stages will be included in this example, though the user is able to remove one or more stages as desired.

Figure 11:
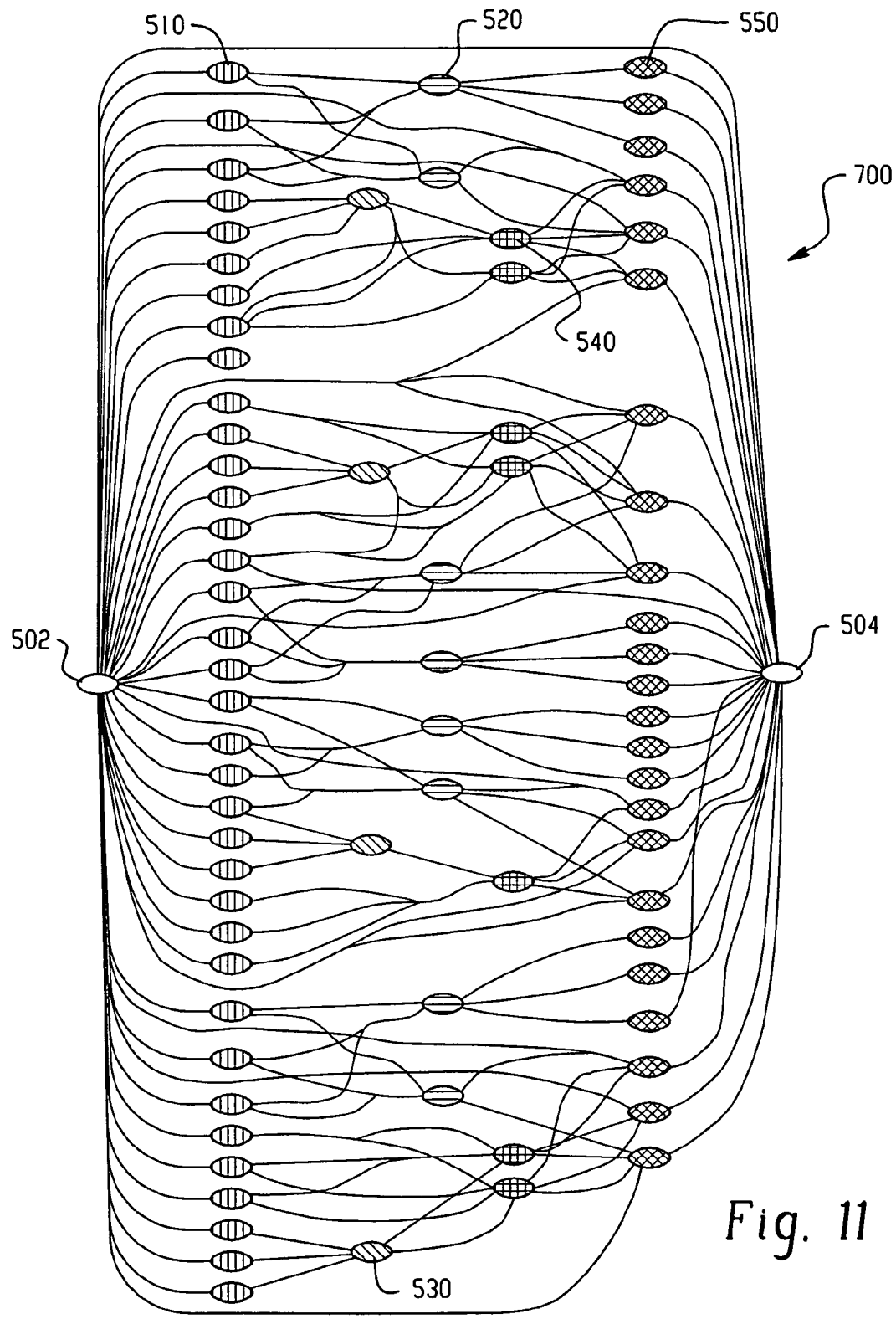
FIG. 11 is a reduced cost flow graph.

If all stages are included as shown in FIG. 10 then a reduced graph is created as shown at 700 in FIG. 11. The effect is to remove all unassigned (white) accounts and to remove assignments between accounts in the same stage. In particular, the stage 3 (green) accounts no longer have assignments between any of them.

Figure 13:
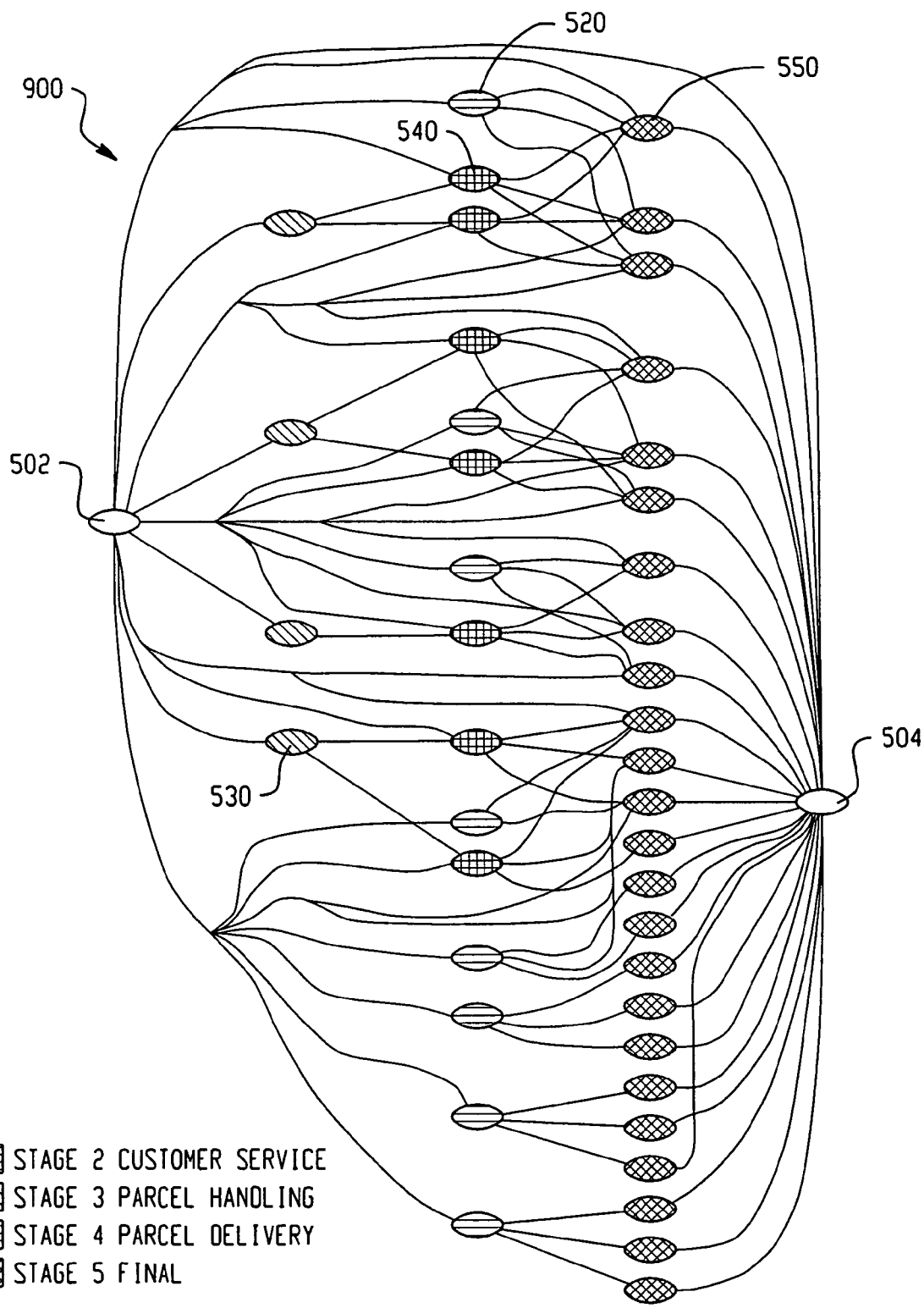

After unchecking the first stage as shown at 800 in FIG. 12, the graph at 900 in FIG. 13 is created. All stage 1 (salmon) accounts have been removed.

Figure 15:
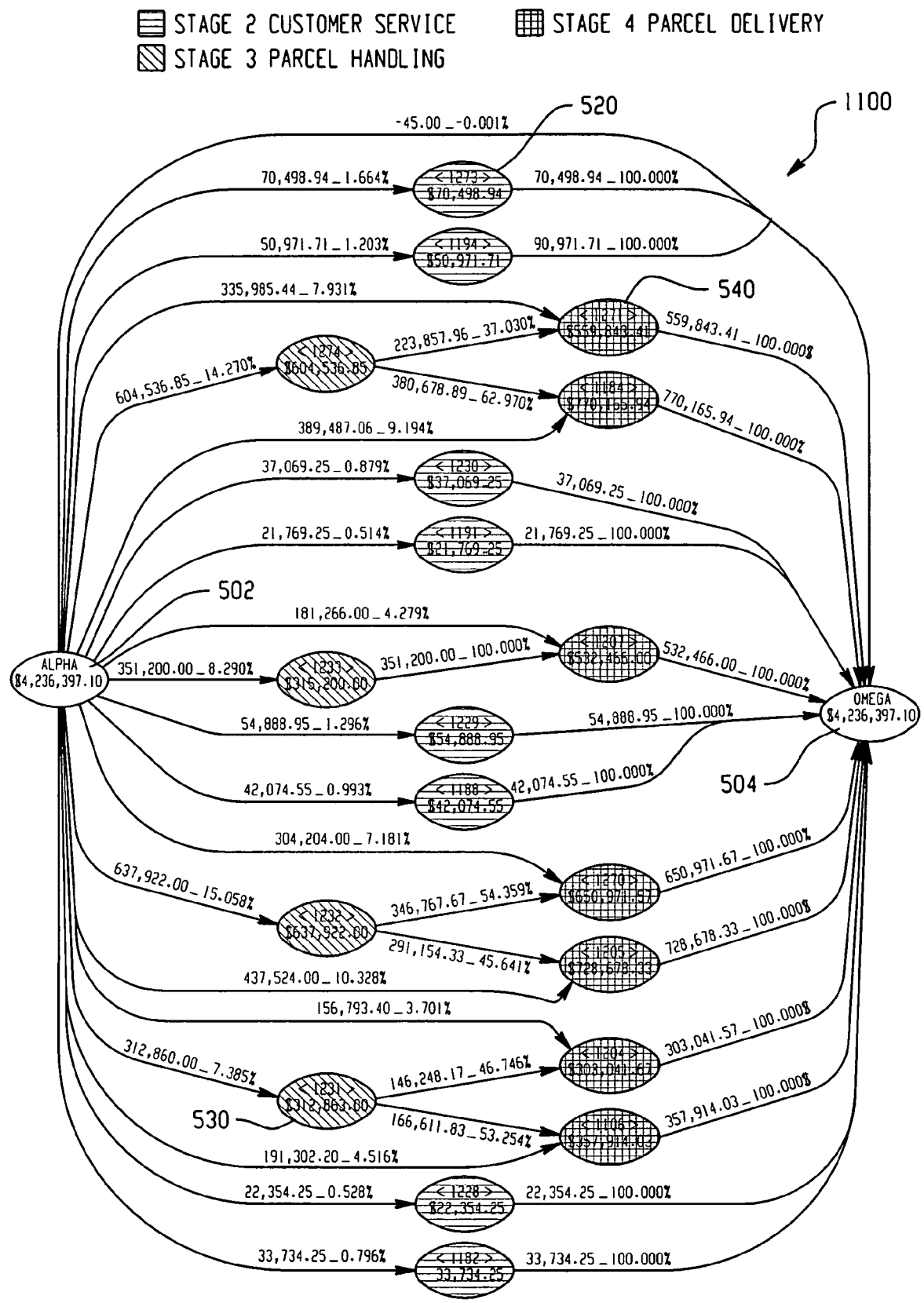
FIG. 15 is a reduced cost flow graph.

Removing the first and last stages as shown at 1000 in FIG. 14 then gives the graph at 1100 shown in FIG. 15.

Figure 16:
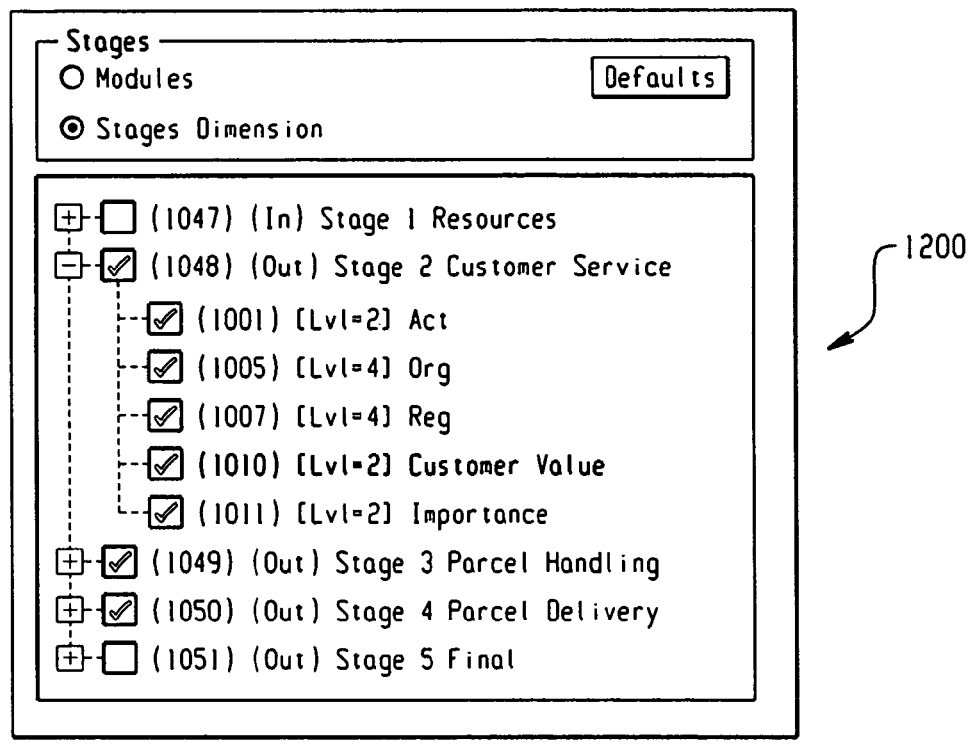
FIGS. 16-18 are graphical user interfaces for specifying cost flow model graph reduction criteria.

Further reductions can occur by causing accounts to be merged based on dimension. Expanding Stage 2 the user interface changes as shown at 1200 in FIG. 16. The accounts in Stage 2 have 5 hierarchical dimensions named Act (e.g., activity), Org (e.g., department), Reg (e.g., region), Customer Value and Importance. The Lvl=indicates the depth of the dimension, each level showing greater detail. For instance, the Reg dimension might be broken down in to country, state, county and city levels.

Figure 17:
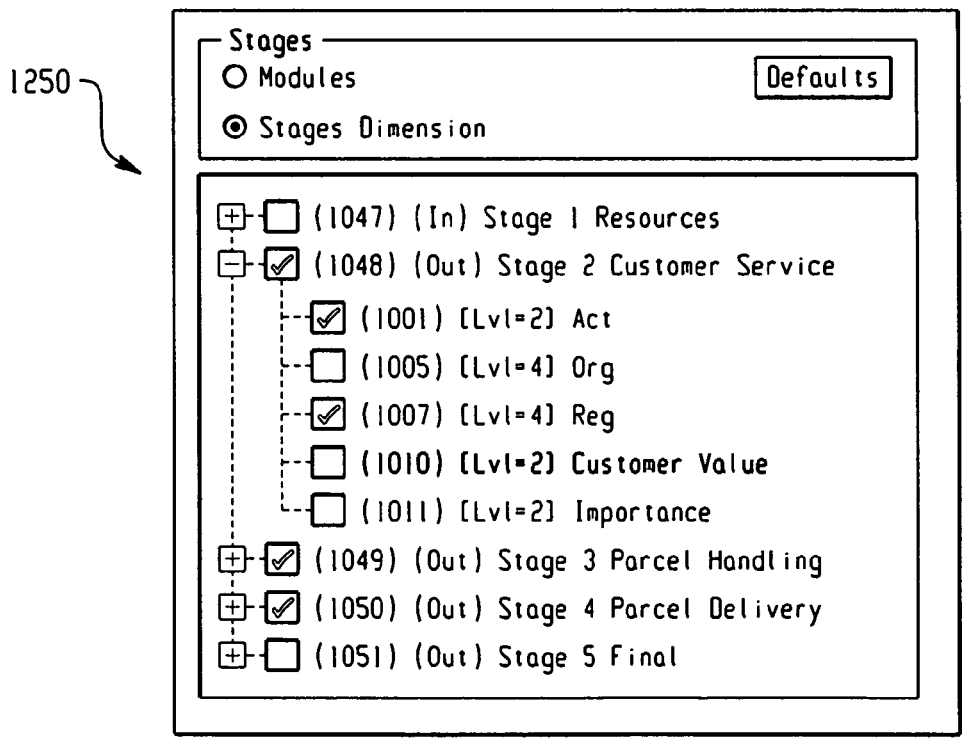

If a user is only interested in the Act and Reg dimensions for the analysis in this example then the dimensions the user is not interested in are unchecked as shown at 1250 in FIG. 17. This means that any accounts that have the same dimension member in the Act and Reg dimensions in Stage 2 (not distinguished by the other dimensions) will be merged together.

Figure 18:
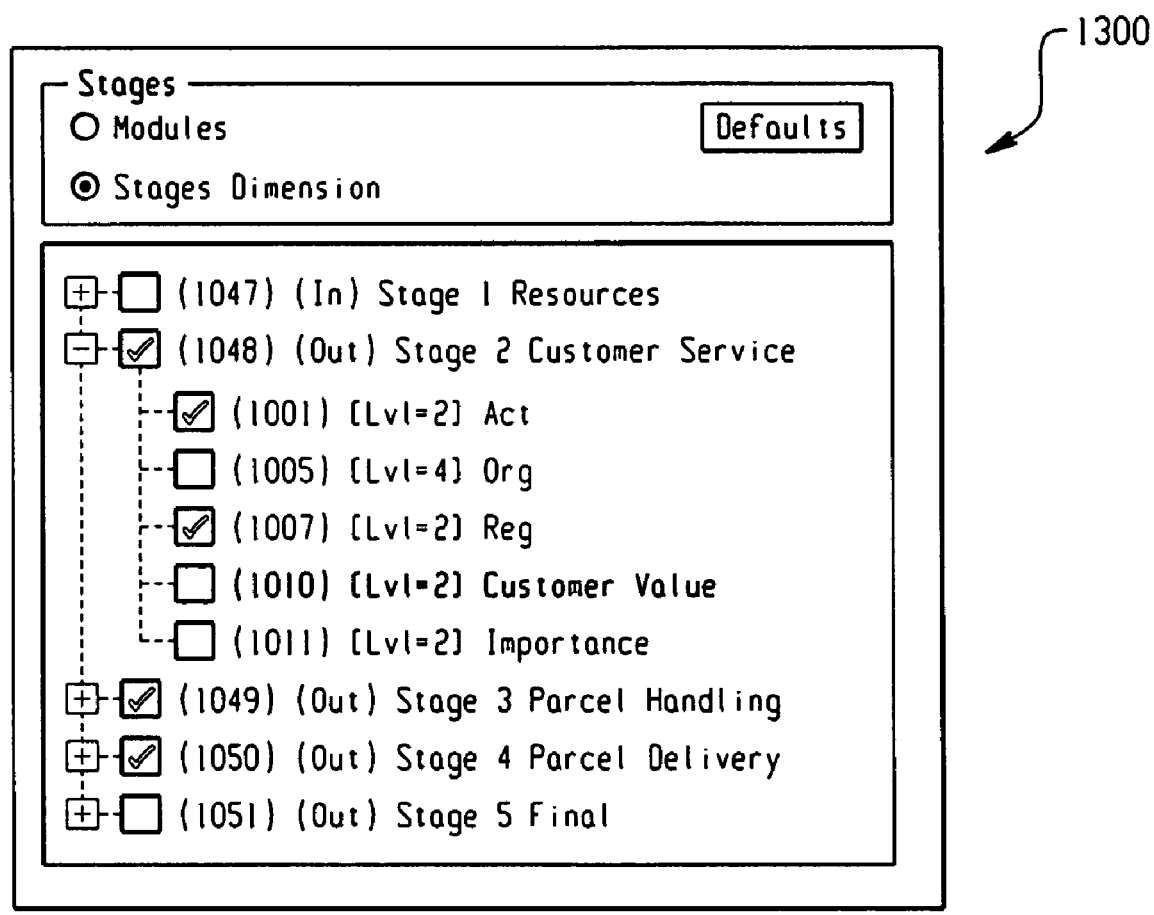

In addition to this account merges can be defined by selecting a higher-level on a dimension. Again using Reg (e.g. region), by selecting level 2 instead of level 4, all accounts with cities (Lvl=4) in the same state (Lvl=2) will be merged together. This final setting is shown at 1300 in FIG. 18.

The options shown here should not be considered the only rules for merging accounts. For example, values other than dimensions can be used, or specific accounts can be specified if desired.

A graph reduction process can perform reductions upon graphs containing reciprocal relationships. Reciprocal relationships can occur where two entities in a graph have obligations to each other. For example, a business may be composed of several departments, including, but not limited to, human resources, information technology, maintenance, test, and assembly. The human resources department provides services to each of the other departments. Similarly, the information technology and maintenance departments provide services to each of the other departments. The human resources, information technology, and maintenance departments all have reciprocal relationships and expenses are assigned both ways between each of these entities. In this example, the amount of service provided to a department determines how much expense is allocated from the servicing department to the receiving department. It should also be understood that some reciprocal relationships are indirect. For example, entity A may assign costs to entity B, which assigns costs to entity C, which assigns costs to entity A. To avoid issues with reciprocal systems, a graph reduction process can perform steps in the following order:

1. Reduce all reciprocal systems
2. Remove stages
3. Remove accounts
4. Merge accounts It should be understood that similar to the other processing flows described herein, the steps and the order of the steps in this process flow may be altered, modified, removed and/or augmented and still achieve the desired outcome. For example, a multiprocessing or multitasking environment could allow two or more steps to be executed concurrently.

To illustrate graph reduction, the following examples are provided and use the following symbology:

| Term | Description |
| --- | --- |
| a, b, c, q, r, s, t, u, v, x, y, z, ... | Single characters are used to represent accounts in diagrams and formulas. |
| qr, rt, ... | Pairs of letters strung together refer to assignments. qr is the assignment between accounts q and r. |
| qrt, rtz, ... | More than a pair represents a path. qrt is the path of accounts q, r and t and assignments qr and rt. |
| α, ω | The system-defined alpha and omega accounts |

As illustrated by the following examples, removing an account is not simply deleting it and its assignments (incoming and outgoing) because, among other things, that breaks the cost flow to the destination accounts. It also includes creating new assignments from the account's source accounts to its destination accounts with costs calculated so that the original cost flow is preserved.

FIG. 19 represents a non-reciprocal non-staged ABC graph that is used to illustrate account removal. Removing account v from FIG. 19 involves taking the cost from t and assigning it directly to y. The cost on the single outgoing assignment of t remains unchanged as shown by the graph at 1450 in FIG. 20. The cost on t and y also remains the same.

Removing an account with multiple outgoing assignments is exemplified at 1500 in FIG. 21. Removing account u from FIG. 19 involves taking the cost from s and dividing it proportionally to t and x. The cost on s, t and x remain the same. To accomplish this, new assignments are created as shown at 1500 in FIG. 21, where the source account (s) of the incoming assignment are the source of the new assignment, and the destination accounts (t and x) are used for the destination of the new assignment. In this case st and sx are obtained. To calculate the correct proportion the following formula is used:

$$abc \rightarrow ac = \text{cost}(ab) \cdot \frac{\text{cost}(bc)}{\text{cost}(b)},$$

where b is the account that is being removed, ab is the cost of the incoming assignment and bc is the cost of the outgoing assignment. In this example, this is applied twice to obtain:

$$sut \to st = \text{cost}(st) = \text{cost}(su) \cdot \frac{\text{cost}(ut)}{\text{cost}(u)} = 100 \cdot \frac{30}{100} = 30$$

$$sux \to sx = \text{cost}(sx) = \text{cost}(su) \cdot \frac{\text{cost}(ux)}{\text{cost}(u)} = 100 \cdot \frac{70}{100} = 70$$

After the new assignments st and sx are created with their costs, u and all its incoming and outgoing assignments are deleted.

Removing an account with multiple incoming assignments is exemplified at 1550 in FIG. 22. Removing account s from FIG. 19 involves taking the incoming assignments of s and redirecting them to a different account as shown in FIG. 22.

This is similar to the previous example, only in reverse. The same approach is used to create the new assignments for each incoming assignment. So qsu is used to create qu, and rsu is used to create ru.

Figure 23:
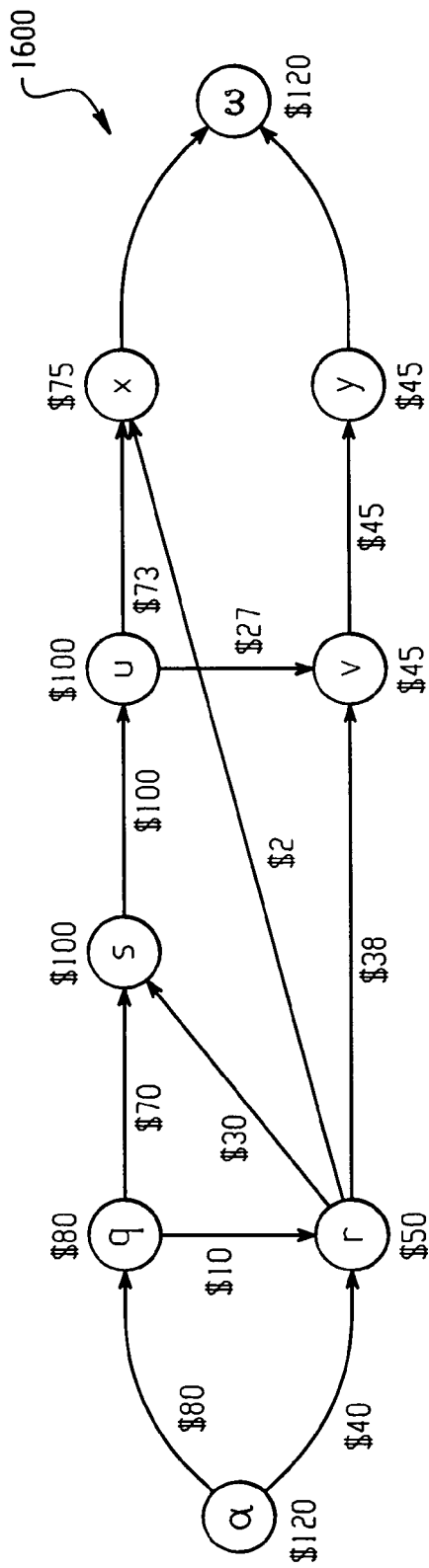

Removing an account with multiple incoming and outgoing assignments is exemplified at 1600 in FIG. 23. Removing account t involves taking all the incoming assignments of t and redirecting them proportionally to the outgoing accounts of t. If an assignment already exists (e.g. ux and rv) then the additional cost is added to the existing assignment. Account costs remain the same, though assignment costs may increase. Proportionality calculations are applied to each of the incoming assignments of t to create new assignments:

$$rtv \to rv = \text{cost}(rt) \cdot \frac{\text{cost}(tv)}{\text{cost}(t)} = 20 \cdot \frac{45}{50} = 18$$

$$rtx \to rx = \text{cost}(rt) \cdot \frac{\text{cost}(tx)}{\text{cost}(t)} = 20 \cdot \frac{5}{50} = 2$$

$$utv \to sv = \text{cost}(uv) \cdot \frac{\text{cost}(tv)}{\text{cost}(t)} = 30 \cdot \frac{45}{50} = 27$$

$$utx \to ux = \text{cost}(uv) \cdot \frac{\text{cost}(tx)}{\text{cost}(t)} = 30 \cdot \frac{5}{50} = 3$$

After these assignments are created, t and all its incoming and outgoing assignments are deleted as shown at 1600 in FIG. 23.

Removing accounts in a reciprocal system is done in a similar way, though it may also require reevaluation of the accounts that make up the reciprocal system and re-flowing the costs through the remaining system(s), if any.

With respect to merging accounts, merging is the process of creating a new account by bringing together two or more accounts. In some cases the result may appear similar to removing accounts, but the resulting account has a new identity that is separate from the original accounts. This process can be applied repeatedly to merge many accounts into a single account, each merged account in the process having a different identity than the previous one. There is no restriction that accounts have to have an assignment joining them before they are merged. If needed a restriction can be imposed when stage reduction is also being used. In this case, accounts are to be in the same stage before they are merged.

Figure 24:
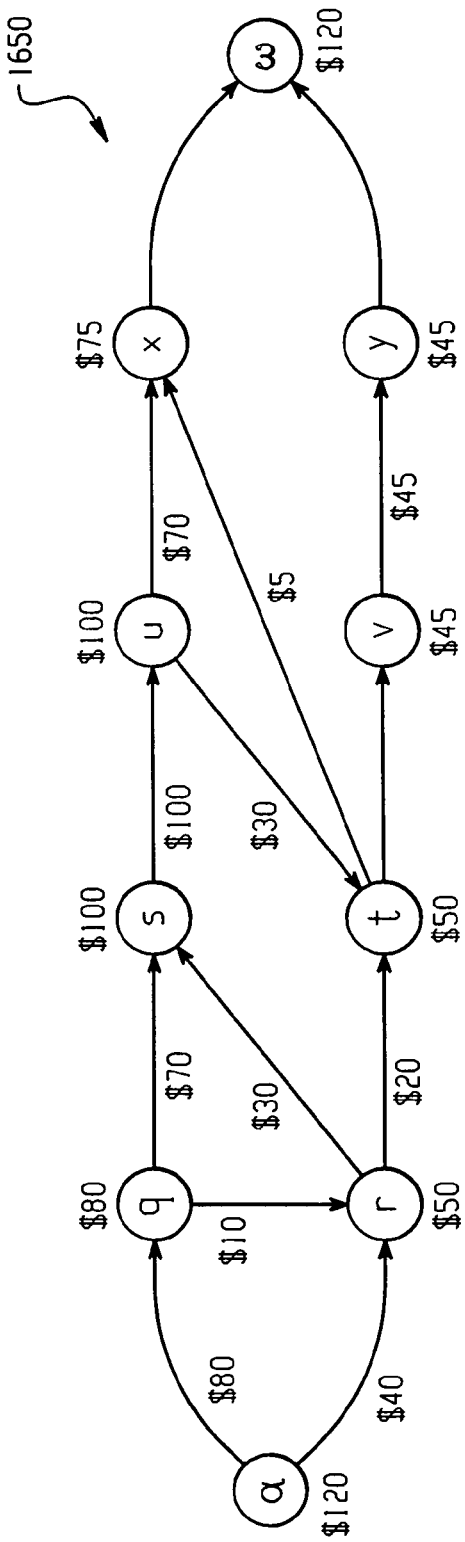

FIG. 24 depicts at 1650 a graph that will be used for the merging examples below. When merging accounts the following steps can be executed:

1. Remove the assignment between accounts that will be merged (if any).
2. Merge accounts into a single account (adding costs, subtracting cost of the assignment between them, if any).
3. Merge assignments to common outgoing accounts (adding costs).
4. Merge assignments to common incoming accounts (adding costs).

Figure 25:
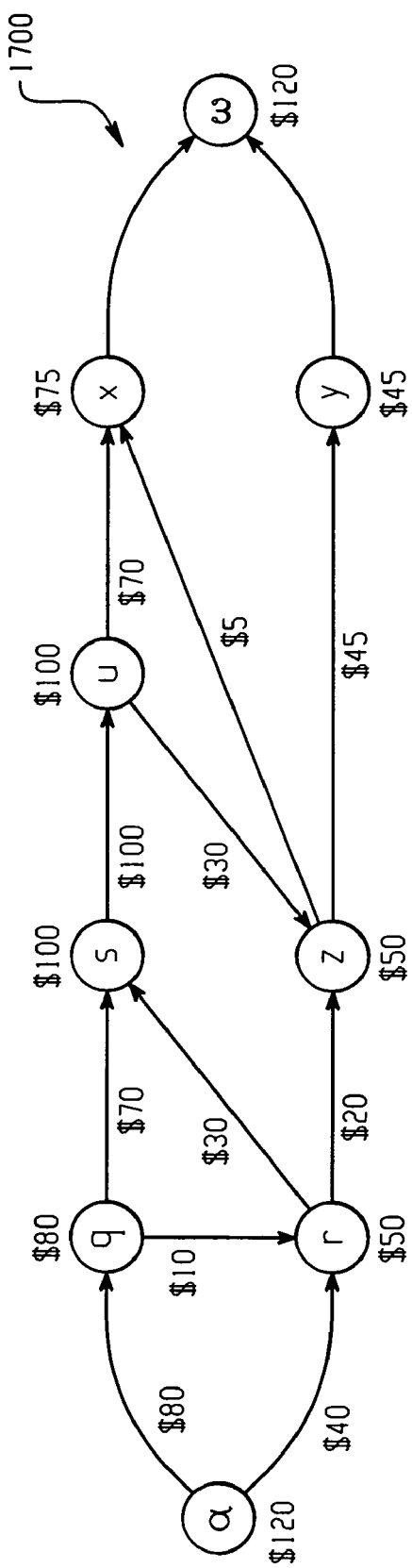

FIG. 25 shows at 1700 the results after merging accounts t and v from FIG. 24 into a single account z. All outgoing assignments of t and v are copied to the new account as are all their incoming assignments. The assignments tv and vy are merged into a single assignment zy, which can is described as tv+vy→zy.

Figure 26:
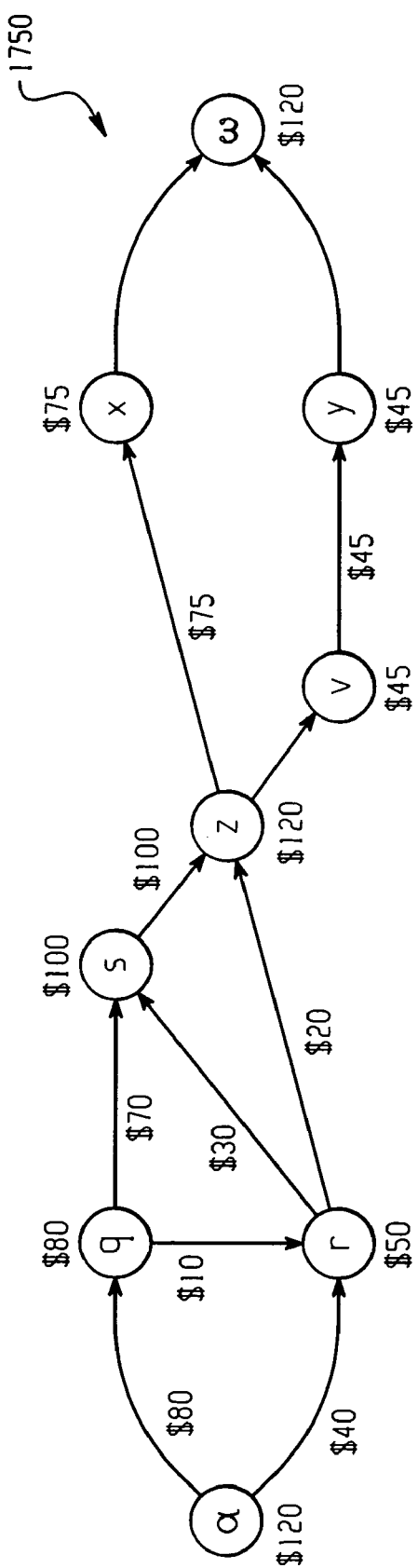

As an example of merging accounts with common assignments, FIG. 26 shows at 1750 the results after merging accounts t and u from FIG. 24 into a single account z. The following merges occurred:

Accounts: t+u→z
Assignments: su→sz, rt→rz, ux+tx→zx, ty→zy

Figure 27:
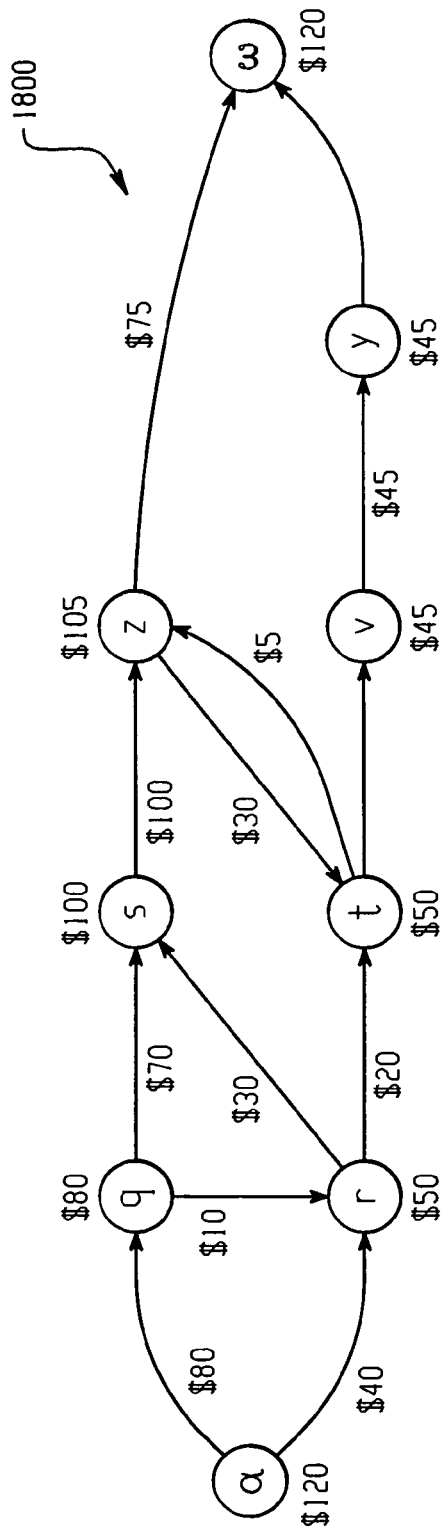

With respect to merging accounts with a creation of a cycle, FIG. 27 shows at 1800 the results after merging accounts u and x from FIG. 24 into a single account z. Notice that a cycle is created between t and z. It appears to be the same as a reciprocal system but in this example is to be handled differently. In a reciprocal system the costs of the accounts and assignments get inflated, but in this case they are not. Reducing reciprocal systems can cause the same situation. To avoid confusion, merging can be done after all reciprocal system reduction is done.

With respect to merging accounts in a reciprocal system, merging accounts where one is in a reciprocal system and another is not (or is a different reciprocal system) follows similar rules as shown, though it may also require reevaluation of the account values that make up the reciprocal system.

With respect to merge criteria, the set of accounts to be merged into a single account can be identified in many different ways. They can be identified as the set of accounts, e.g., {u,x}→z. They can also be merged based on common attributes, e.g., all accounts in stage 3 will be merged into a single account. Another way to define the merge is based on a dimensional intersection on the accounts. A dimensional intersection is a set of references to dimension members, where the members belong to different dimensions. Dimensional intersections are an attribute of accounts and can be used as the criteria to merge accounts. By removing a number of dimensions, existing accounts may then share the same intersection and can be merged.

Another way to merge accounts based on dimensional intersection is to change one or more members in the intersection to be an ancestor member, effectively creating a summarization account. When this is done, accounts can be merged based on common intersections.

All of these methods and others can be used in isolation or in any combination.

Stage reduction can be done in many different ways. As an example, an ABC graph can be segmented into groups of accounts called stages and can be used to simplify the organization of a graph for reporting purposes. Stages represent the logical, left-to-right (or roughly thereof), flow in the graph as shown at 1850 in FIG. 28. For this reason the order of the stages can be considered to be significant.

Figure 28:
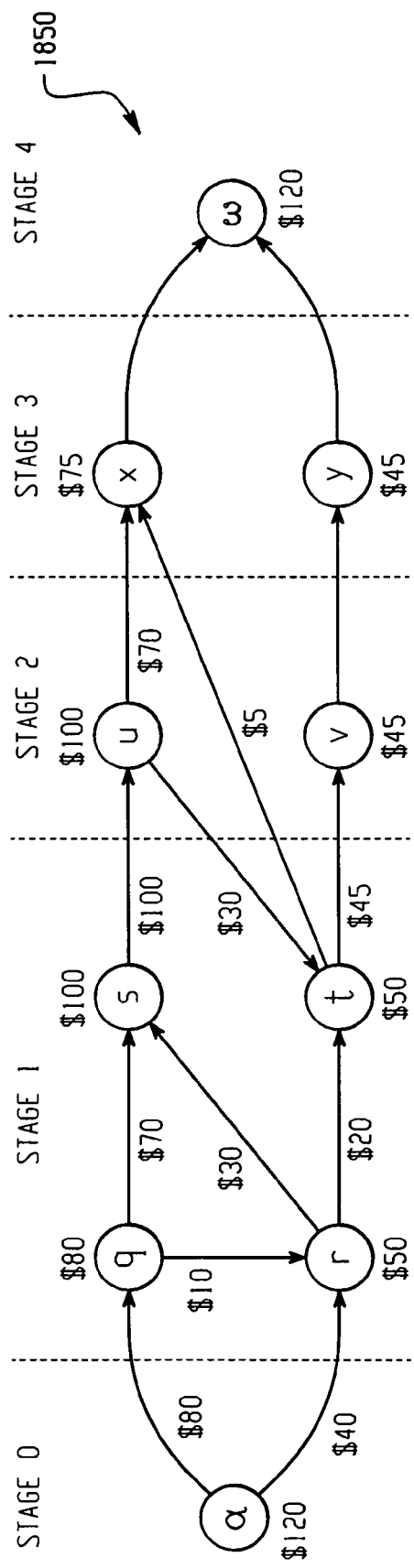

A stage has a set of input accounts and a set of output accounts. Input accounts represent the costs as they enter the stage and are identified by incoming assignments coming from a different stage. Output accounts represent the costs as they exit the stage and are identified by outgoing assignments going to a different stage. Examples of input accounts in FIG. 28 are q and r. An example of an output account is s. Examples of both input and output accounts are t, u, v, x and y. Accounts can be neither input nor output, where all its incoming and outgoing assignments are from and to the same stage.

Different rules can govern stages such as the following:
There is no requirement that an account be in a stage, except for α and ω which are always in their respective stages.
Accounts are not in more than one stage.
Merges do not occur across stages.

Stage reduction takes an ABC graph and an action for each stage and creates a reduced graph with certain characteristics. Examples of stage actions are shown in the following table:

| Action | Description |
| --- | --- |
| Remove | Remove all accounts in the stage |
| Input | Include costs as they enter the stage |
| Output | Include costs as the exit the stage |

After the stage reduction is complete the resulting graph has the following characteristics:
All accounts are in a stage.
All incoming and outgoing assignments for an account go from or to a different stage.

When stage reduction occurs, two implied actions occur before any other action occurs:
1. Remove all accounts that are not in a stage using the rules related to removing accounts (i.e., the account removal rules discussed above).
2. Remove all accounts that only have assignments to and from the same stage using the account removal rules.

Figure 29:
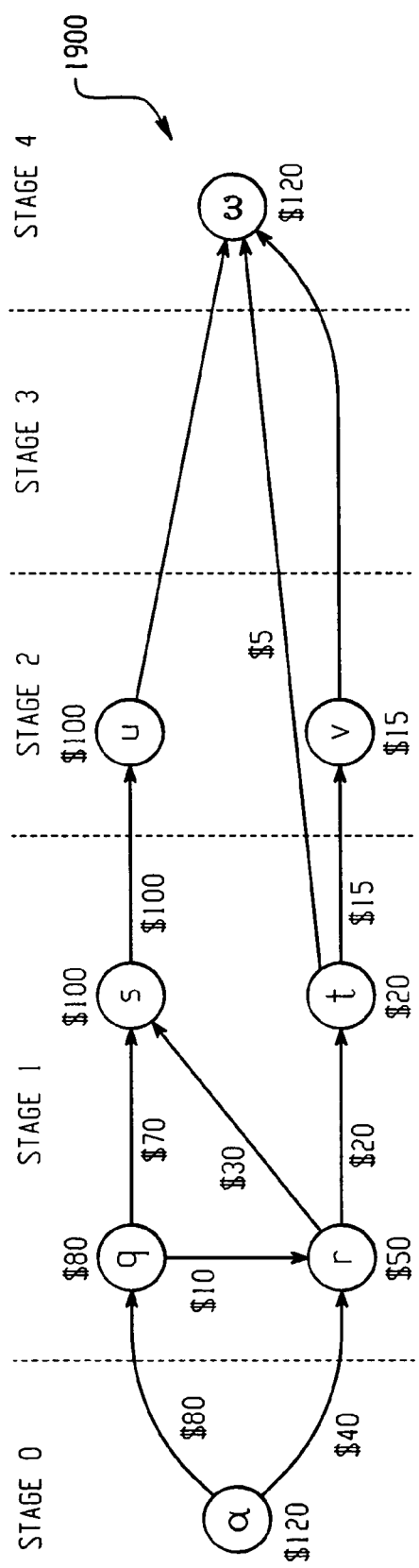

As an illustration of a remove action, removing stage 3 from FIG. 28 results in the graph shown at 1900 in FIG. 29, wherein all the accounts in the stage are removed, using the account removal rules.

Figure 30:
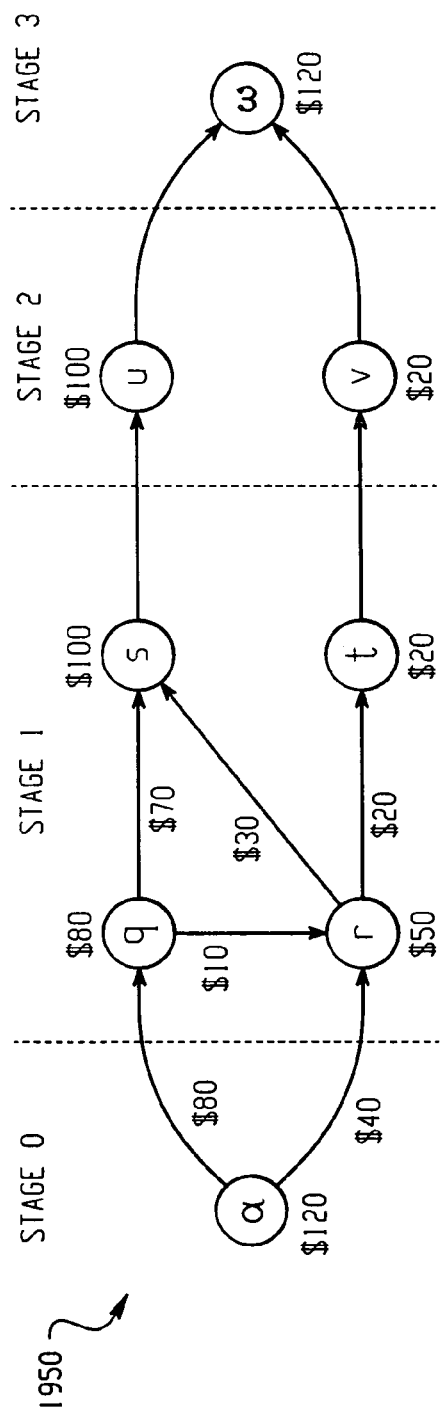
Figure 31:
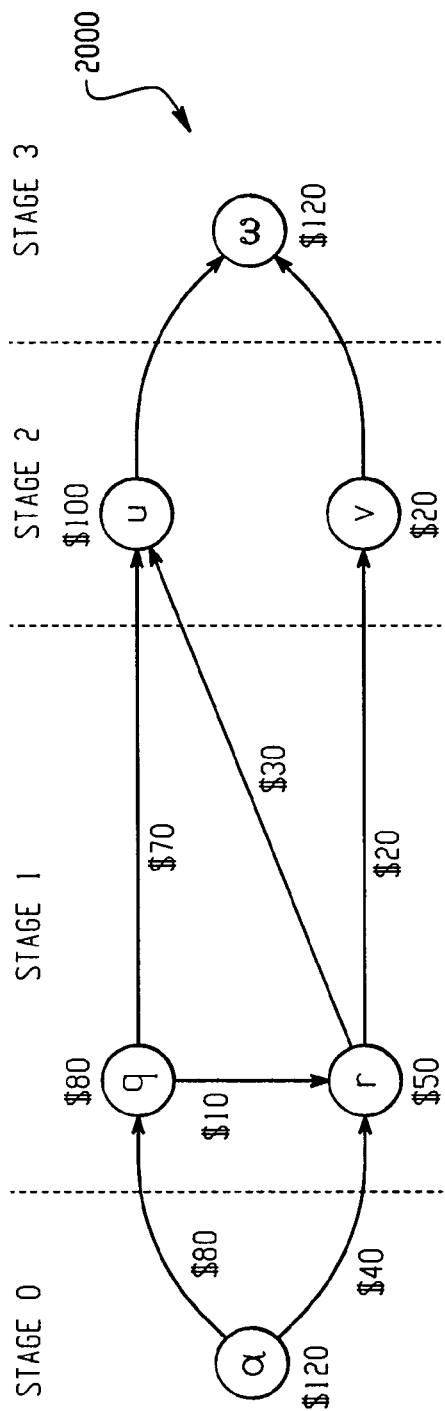

As an illustration of an input action, FIG. 30 depicts at 1950 the starting graph for this case. Stage 2 will not change if an input or output action is selected. Only Stage 1 is affected because it has assignments that go between accounts in the same stage. When input is selected for Stage 1 any accounts that only have incoming assignments from stage 1 will be removed, using the account removal rules. Application of those rules results in the graph shown at 2000 in FIG. 31.

Figure 32:
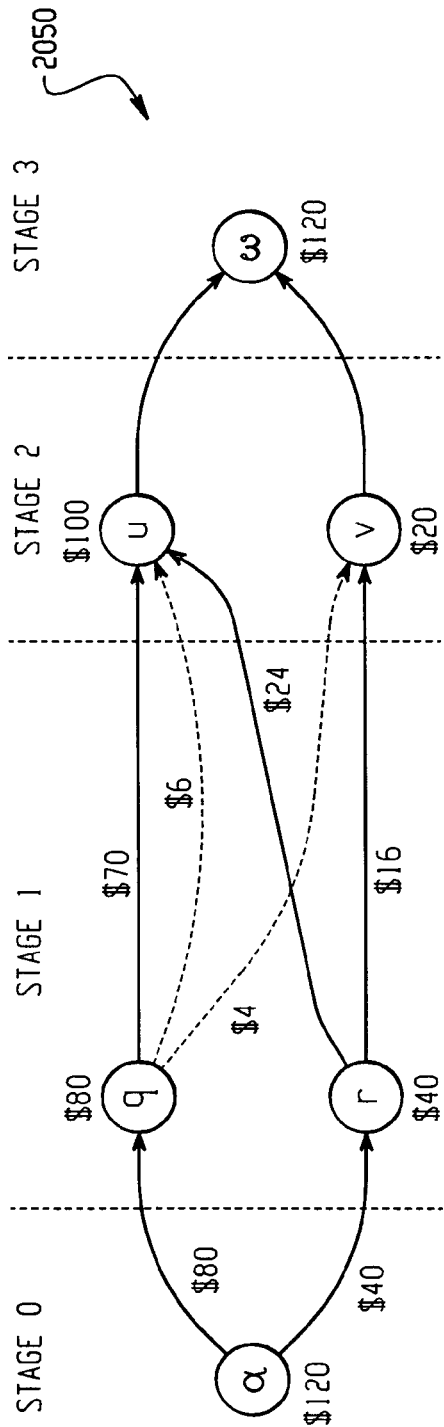

Processing continues because there is still an assignment between two accounts in Stage 1. However, the assignment qr violates the goal that "All incoming and outgoing assignments for an account go from or to a different stage." To correct this, the qr flow is rerouted around r to the accounts in the next stage as shown at 2050 in FIG. 32.

When qr is rerouted r is decreased by its cost ($10). This means that r is 80% of its original value. All of r's outgoing assignments is also decreased by 80%, resulting in the new costs for ru and rv. qr's $10 is proportionally distributed to the same outgoing accounts of r, preserving the same cost distribution as the outgoing assignments of r. For instance, 60% of r's costs are assigned to u and 20% to v. qr's cost is also distributed so that 60% of its cost goes to u and 40% to v. Merging the two assignments between q and u is the performed and their costs added.

Figure 33:
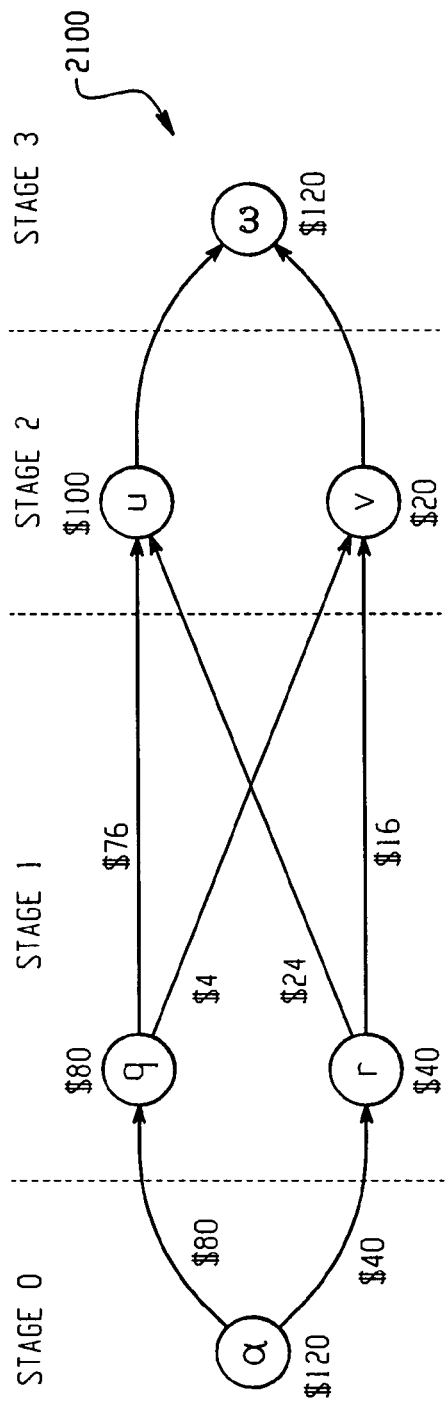

After all this is done r has less cost than it started with because not all of its cost came from a different stage. However this is corrected once the cost reaches Stage 2. The final graph is shown at 2100 in FIG. 33.

Figure 34:
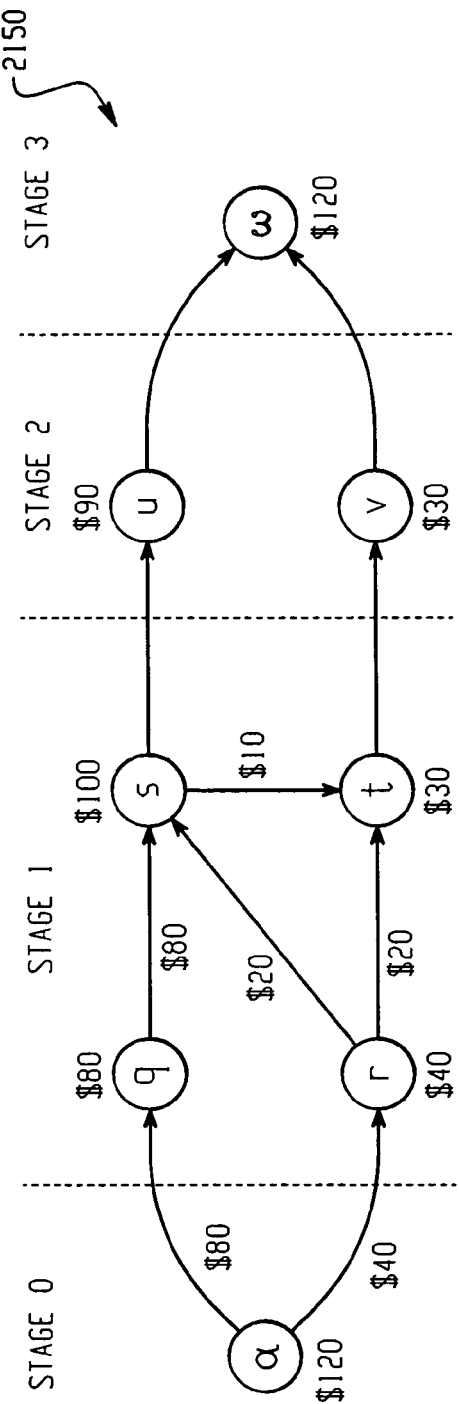
Figure 35:
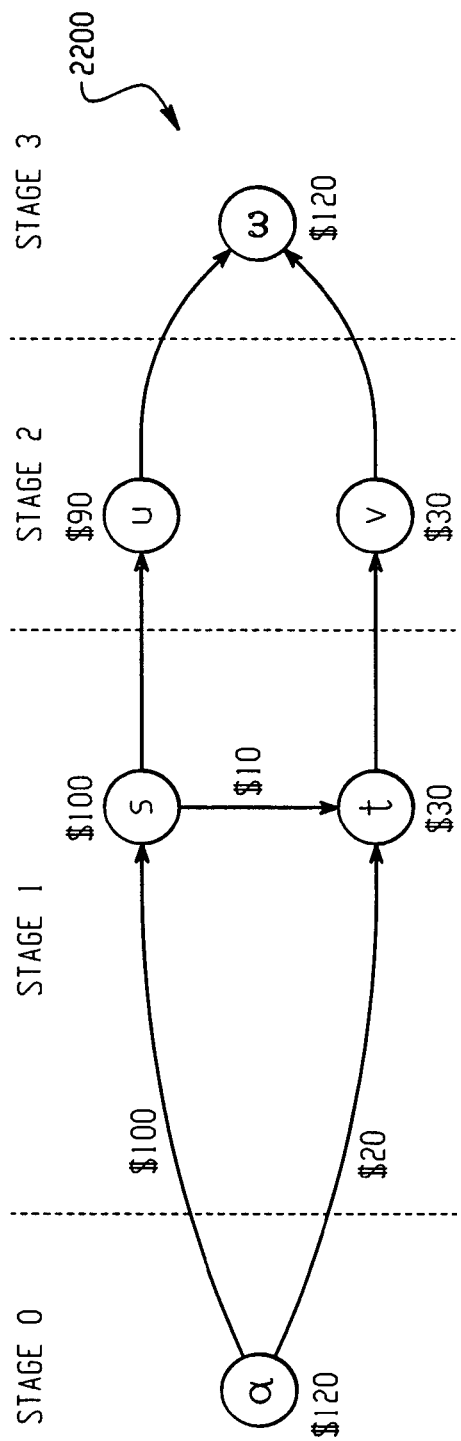

In stage reduction, the output action is similar to the input action. FIG. 34 shows at 2150 the starting graph that will be used for this example. With Stage 1 set to Output, the first step is to remove all accounts in Stage 1 that only have outgoing assignments to other accounts in Stage 1. Accounts q and r are removed, using the account removal rules to provide the graph shown at 2200 in FIG. 35.

Figure 36:
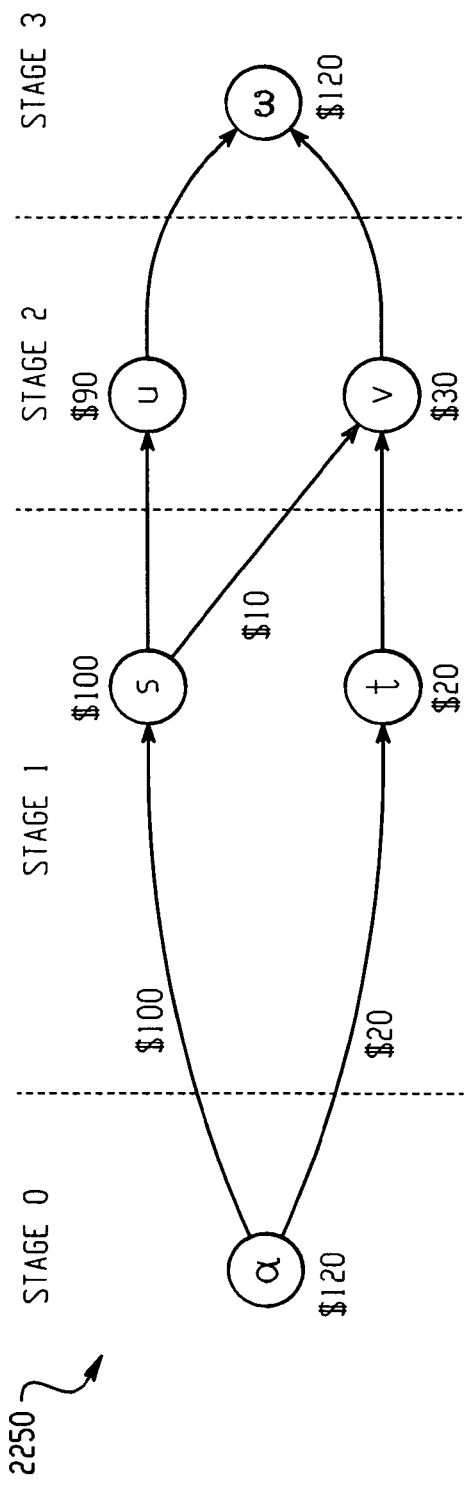

The assignment st is between two accounts in the same stage which violates the goal that "All incoming and outgoing assignments for an account go from or to a different stage." To correct this, the qr flow is rerouted around r to the accounts in the next stage. Also to correct this st is to be rerouted around t and split to the same outgoing accounts of t, in the same proportion as t's outgoing assignments. In this case there is one outgoing assignment. The final graph is shown at 2250 in FIG. 36.

Account t has less than the original value because s had some of its cost going to a different stage and some to the same stage. As in the Input Action example, this change in value is localized to stage 2 and does not affect other stages.

Figure 37:
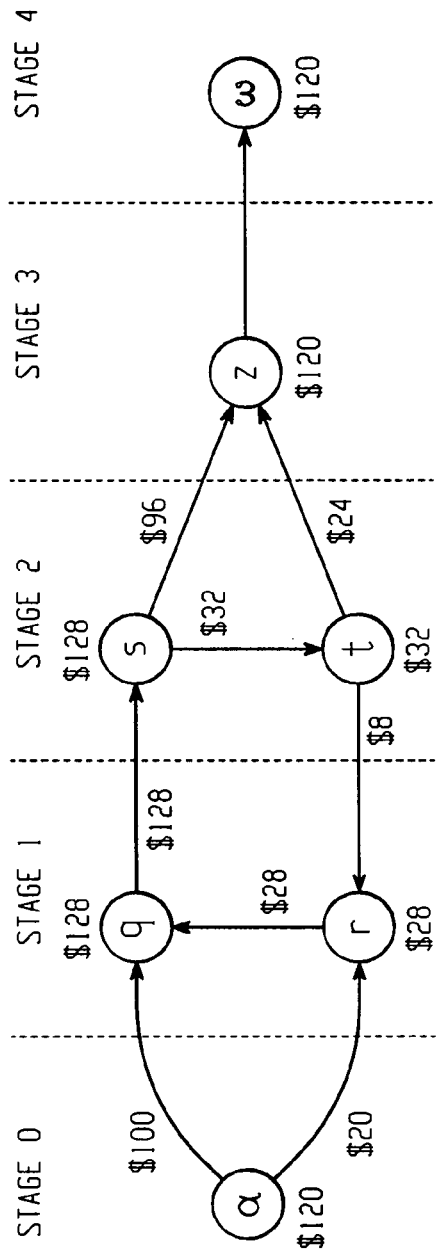

ABC flow graphs can include reciprocal relationships as shown for accounts r, s, t and q at 2300 in FIG. 37. The flow in a reciprocal system is typically calculated using a system of simultaneous equations. Simultaneous equations can also be used to transform it into non-reciprocal assignments and then all the previous logic can be used to reduce the model.

A side effect of using simultaneous equations is that all the accounts in the reciprocal system have inflated values. Intuitively, q and r only receive a total of $120 from outside the system yet their total cost is $128+$28=$156. This can also be seen with accounts s and t, where the total non-reciprocal cost exiting them to z is $120 but their total cost is $128+$32=$160. Another observation is that standard flow algorithms do not do well when cycles exist, as they do in a reciprocal system. Such algorithms will go through the system infinitely looking for the end of a path.

To address these issues, simultaneous equations are used to evaluate the flow through the reciprocal system and the results are then used to transform the assignments and accounts in the reciprocal system to eliminate the cycles. To determine the flow through the system, all costs with incoming, non-reciprocal costs are set to a cost of zero. Then one-by-one, each account is assigned $1 which is flowed through the system which represents 100%. The result of this will generate Table 1 shown below which shows the percentage distribution of where the costs exit the system. It shows that cost enters the reciprocal system at q and r, and exits at s and t, with a given percentage of the entry account's cost. The table then contains the cross product of all accounts with incoming non-reciprocal assignments and accounts that have outgoing non-reciprocal assignments.

TABLE 1

| Enter | Exit | Percent |
| --- | --- | --- |
| q | s | 1.0667 |
| q | t | 0.2667 |
| r | s | 1.0667 |
| r | t | 0.2667 |

Figure 38:
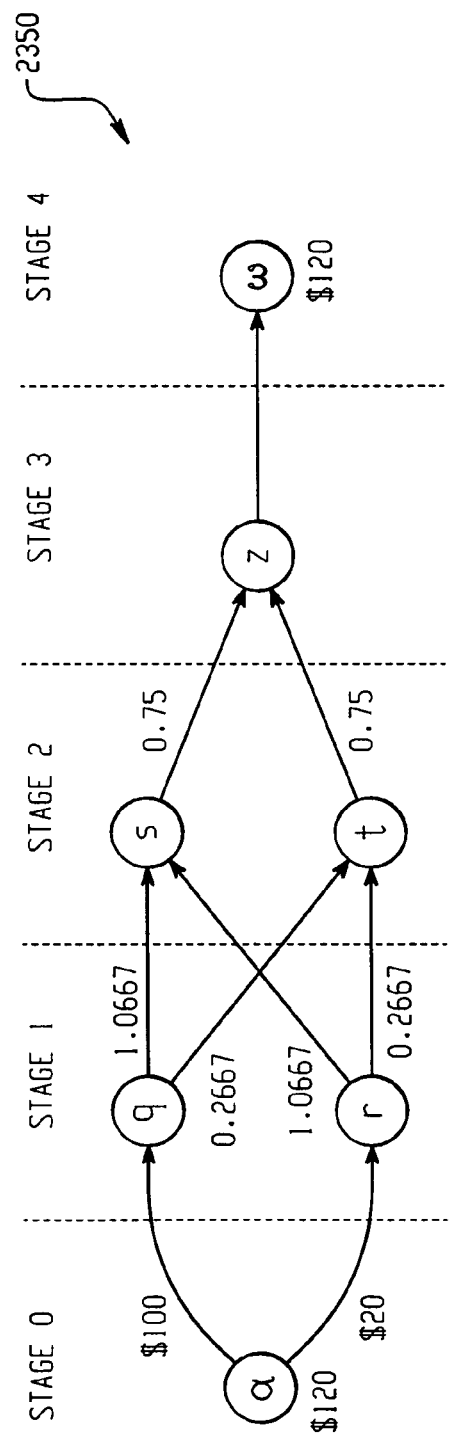

The entries in Table 1 represent a new, non-reciprocal flow between the accounts in the reciprocal system. FIG. 38 shows at 2350 these new flows added and the old, reciprocal assignments removed. The outgoing non-reciprocal assignments have also been given a value, which is the percentage of that assignment's cost relative to the original value of the source account. For instance, st=$96/$128=0.75.

A number of new costs are to be calculated, including all the accounts that were formally in the reciprocal system and the new assignments between them. All other non-reciprocal costs flowing out of those accounts will remain the same. The following steps are taken:

1. All accounts that had incoming non-reciprocal costs (e.g., q and r) are the sum of the incoming assignment costs.
2. Each new assignment (e.g., from Table 1) are calculated as $$\mathrm{cost}(uv) = \mathrm{cost}(u) \cdot pct(uv) \cdot \sum pct(vw)$$

where flow(uv) is the value in Table 1 and pct(vw) represents all the percentages of outgoing assignments. In this case, pct(vw) is a single assignment for s and t.
3. All accounts that had outgoing non-reciprocal costs (e.g. s and t) are the sum of the incoming assignment costs.

Figure 39:
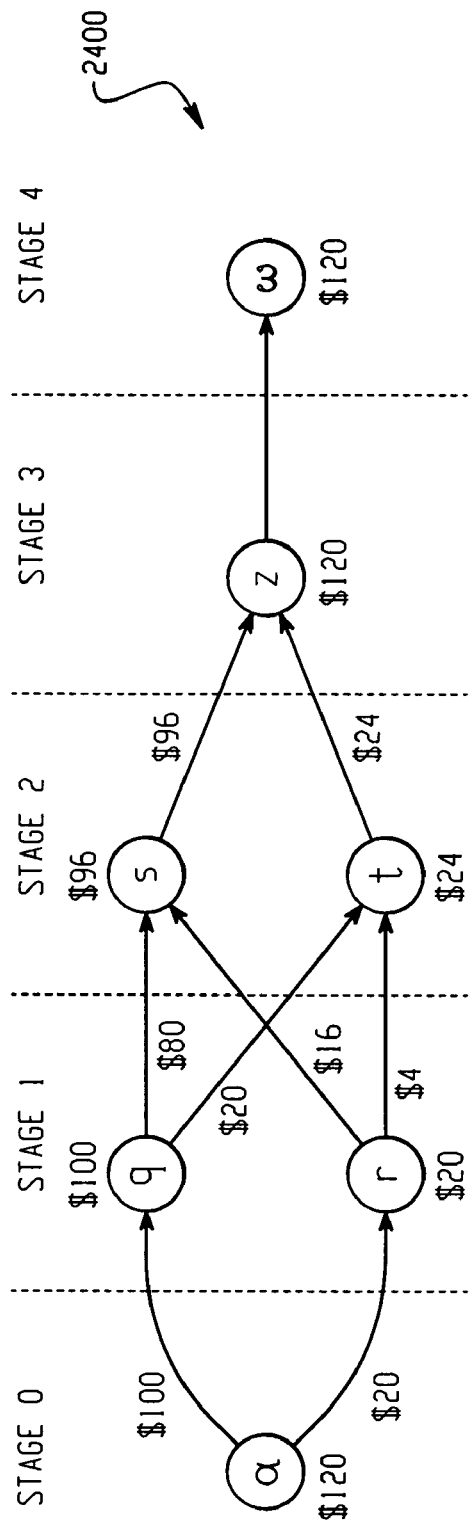

Applying rule 1, q=$100 and r=$20. Applying rule 2 yields:

$qs=\$100 \cdot 1.0667 \cdot 0.75=\$80$ $qt=\$100 \cdot 0.2667 \cdot 0.75=\$20$ $rs=\$20 \cdot 1.0667 \cdot 0.75=\$16$ $rt=\$20 \cdot 0.2667 \cdot 0.75=\$4$ The final graph after all costs have been applied is shown at 2400 in FIG. 39. Notice that the cost on all assignments out of a and into z did not change. The costs on the accounts that were in the reciprocal system are no longer inflated. Once the reciprocal system has been transformed into a non-reciprocal system the other reduction steps can be applied to remove or merge accounts, or to do a stage reduction.

Figure 40:
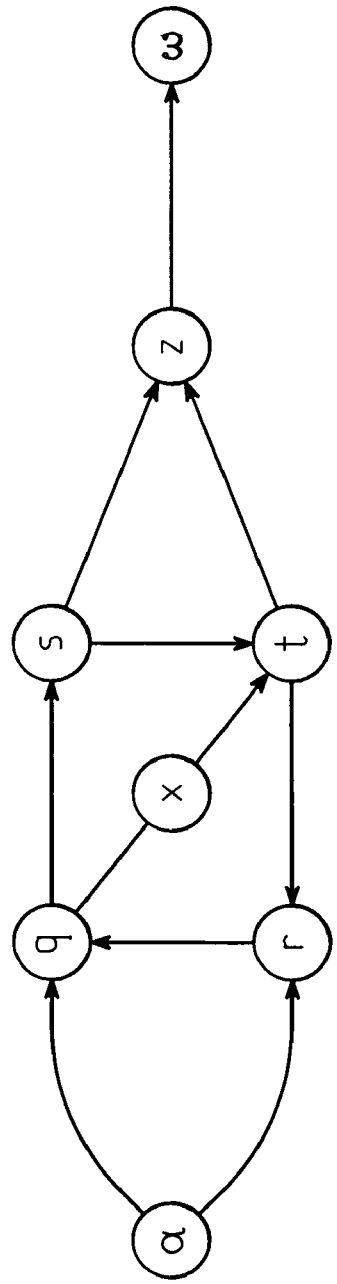

With respect to interior accounts, accounts that only have incoming and outgoing reciprocal assignments are removed as a consequence of this operation. Account x in FIG. 40 will be removed when the reciprocal system is transformed into a non-reciprocal system. In this case, FIG. 40 will have the same set of accounts and assignments as FIG. 39, though with a different flow because x causes the costs to be redistributed differently.

Figure 41:
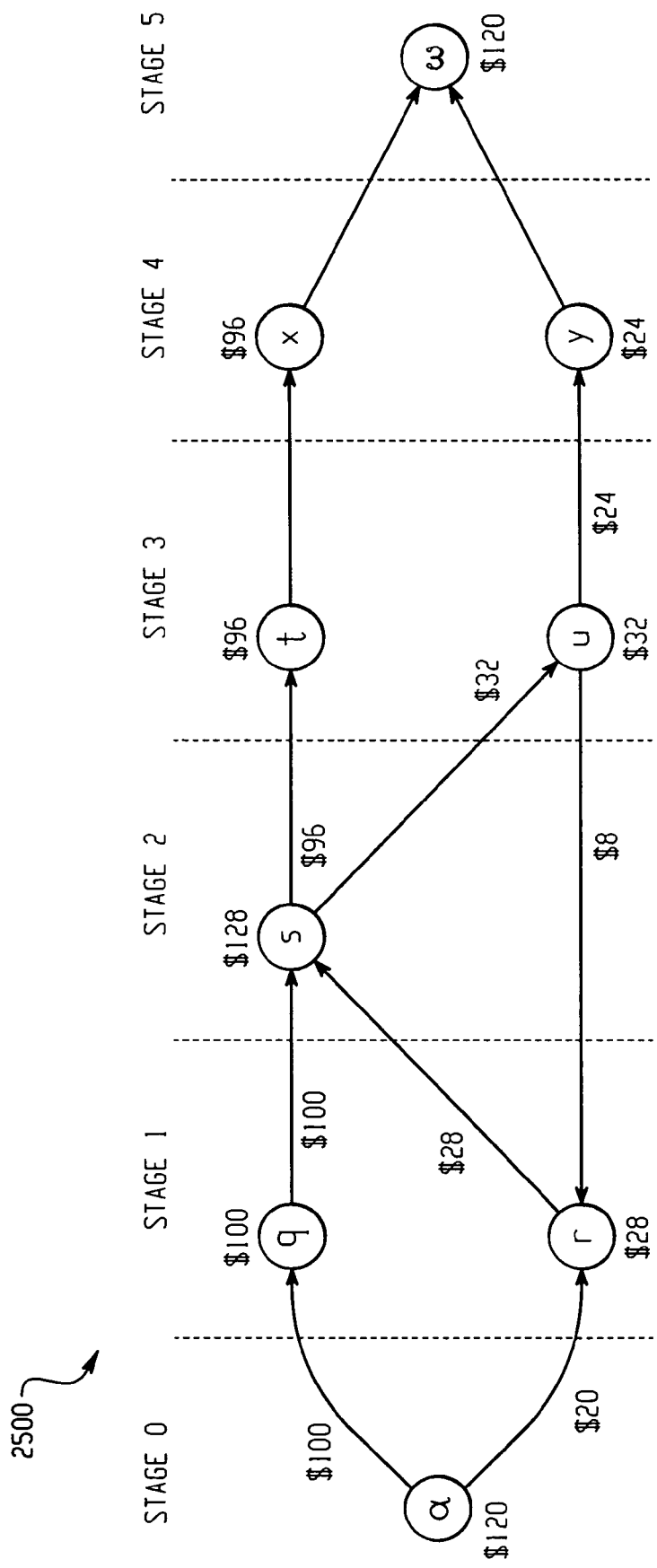
Figure 42:
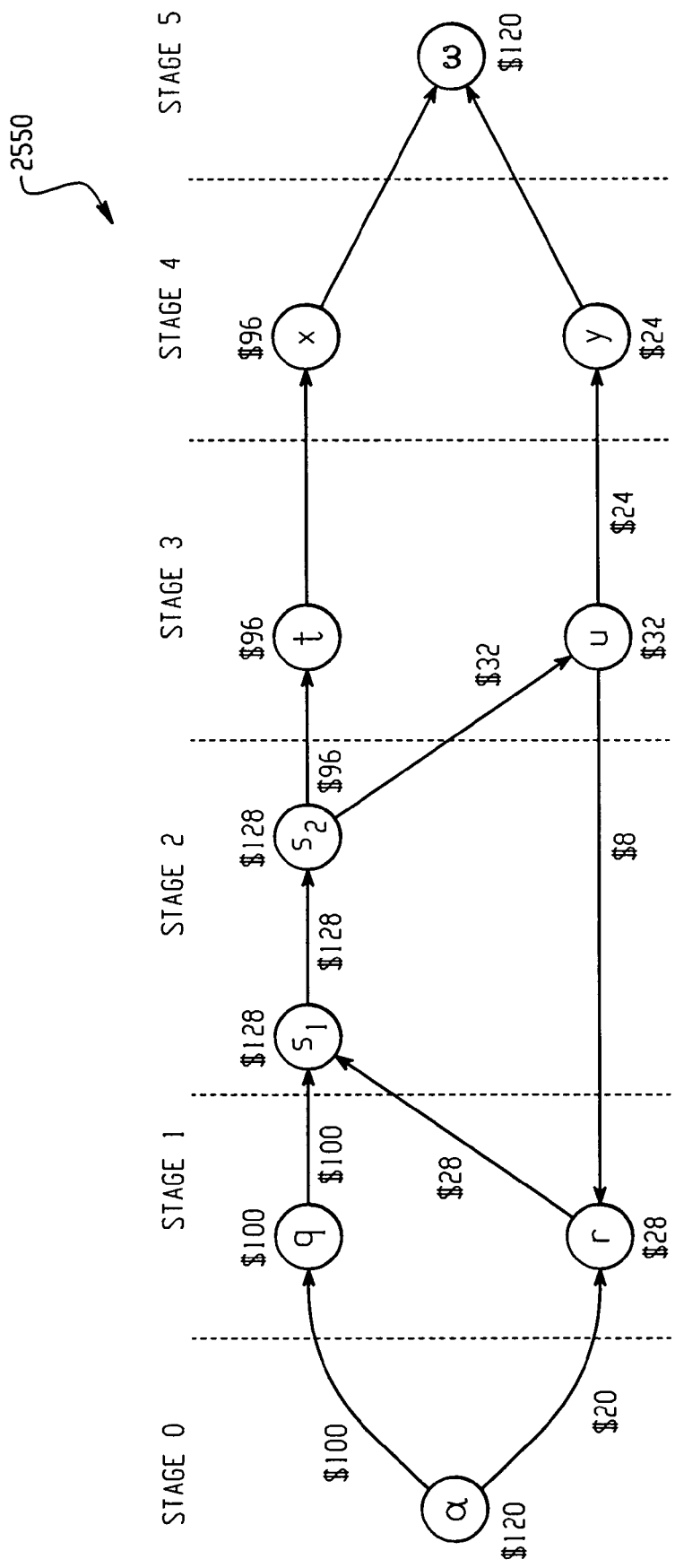

With respect to accounts with incoming and outgoing non-reciprocal costs, FIG. 41 depicts at 2500 a reciprocal account that has both non-reciprocal incoming and outgoing assignments, as s does. This can be redrawn by splitting s into $s_1$ and $s_2$ as shown at 2550 in FIG. 42, where $s_1$ gets all the incoming assignments of s and $s_2$ gets all the outgoing assignments of s. A single assignment is added between $s_1$ and $s_2$ to flow 100% of the $s_1$ cost to $s_2$.

Figure 43:
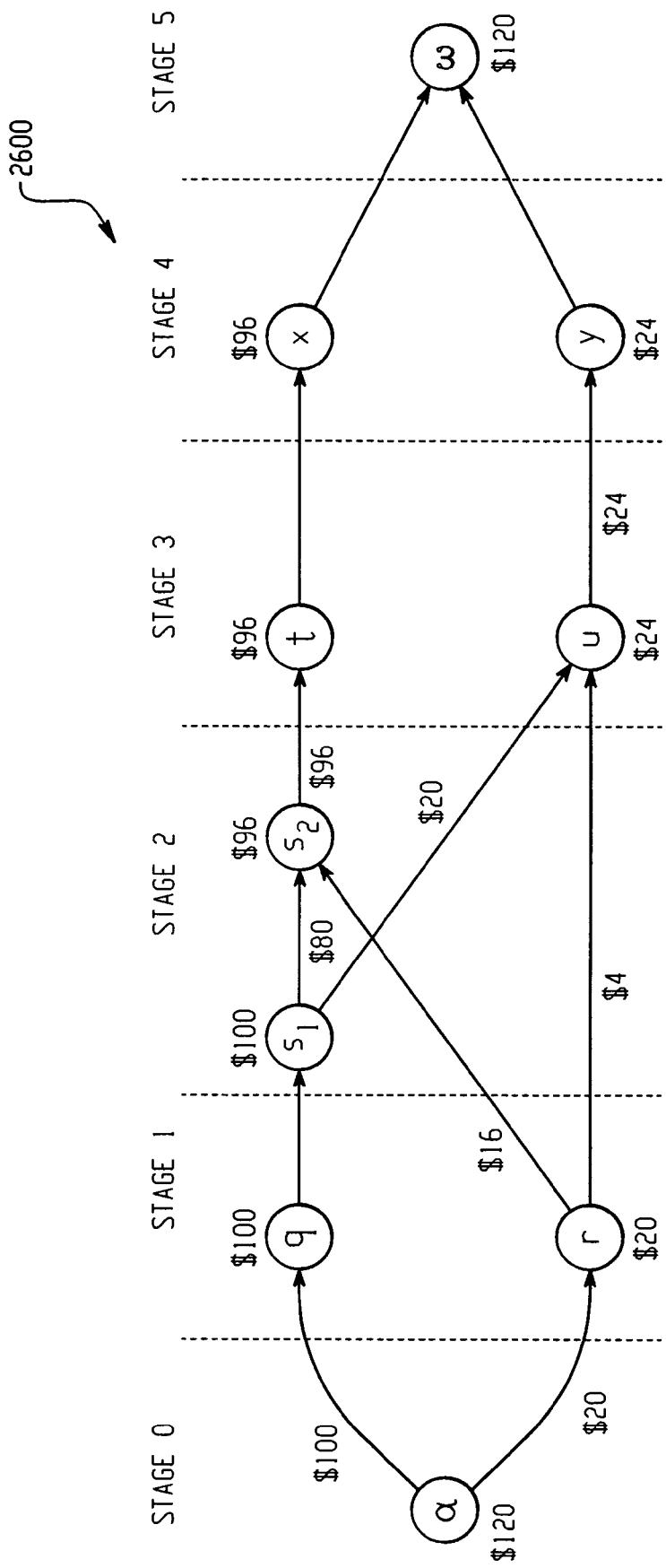

With this in place, the graph can be processed in the same way as the example graph in FIG. 37 was processed. The table to transform the reciprocal system is shown in Table 2 and the resulting graph is shown at 2600 in FIG. 43.

TABLE 2

| Enter | Exit | Percent |
|---|---|---|
| $s_1$ | $s_2$ | 1.0667 |
| $s_1$ | u | 0.2667 |

TABLE 2-continued

| Enter | Exit | Percent |
|---|---|---|
| r | $s_2$ | 1.0667 |
| r | u | 0.2667 |

Figure 44:
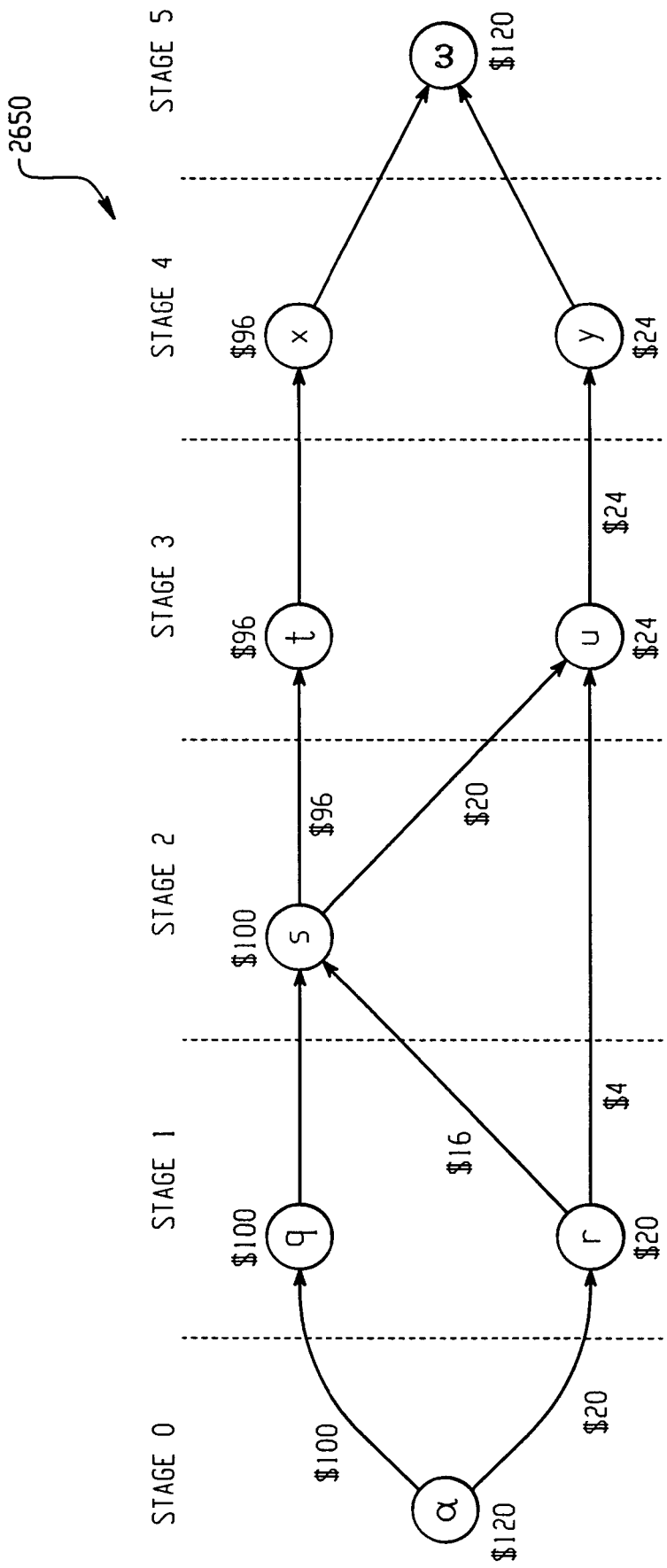

$s_1$ and $s_2$ are merged together into a single s, giving the final reduced graph depicted at 2650 in FIG. 44.

Figure 45:
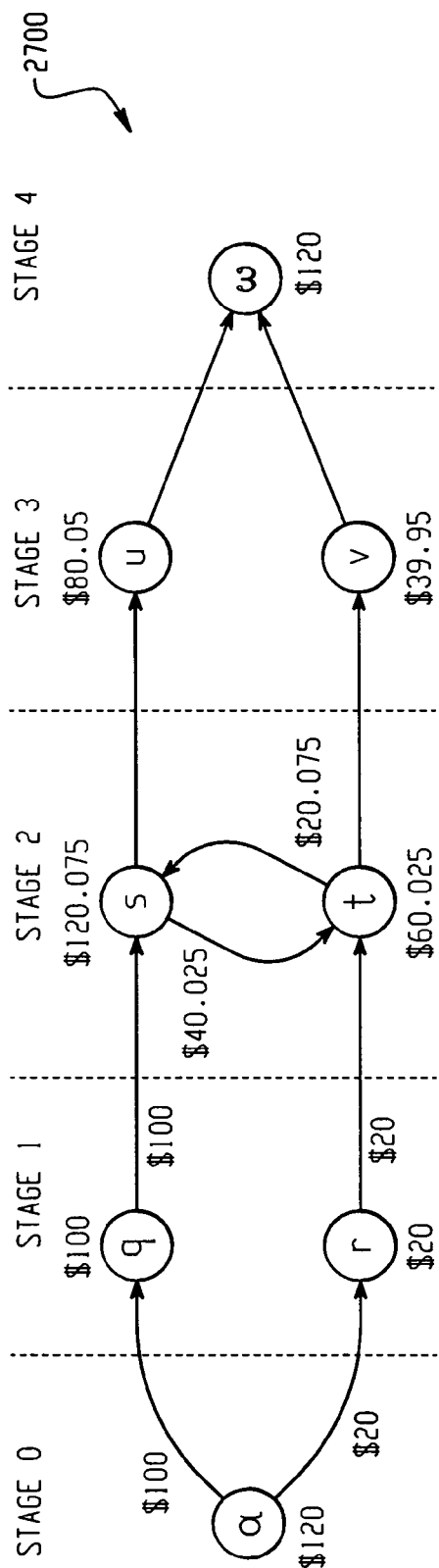
Figure 46:
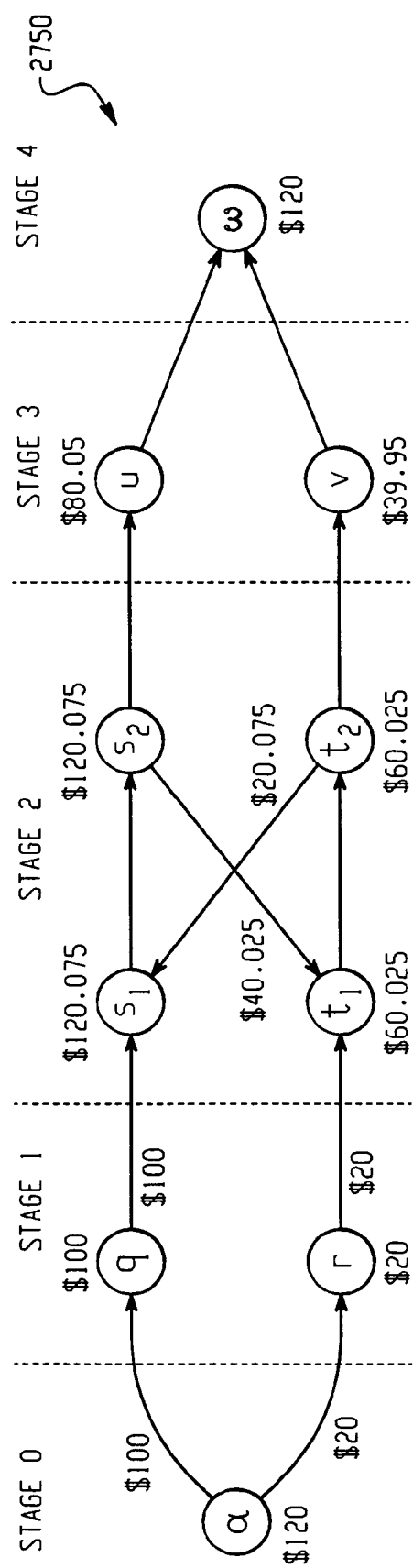

It is possible for a cycle to exist in the resulting graph after a reciprocal system has been removed. To show when this occurs the graph depicted at 2700 in FIG. 45 will be used. In this example there are only two accounts in the reciprocal system, each having incoming and outgoing non-reciprocal costs. This is transformed into the graph shown at 2750 in FIG. 46 by splitting the s and t into two accounts because they have both non-reciprocal incoming and outgoing costs. Table 3 is used to transform the system in to a non-reciprocal system, as discussed above:

TABLE 3

| Enter | Exit | Percent |
|---|---|---|
| $s_1$ | $s_2$ | 1.125 |
| $s_1$ | $t_2$ | 0.375 |
| $t_1$ | $s_2$ | 0.367 |
| $t_1$ | $t_2$ | 1.125 |

The table is then used to create the graph shown at 2800 in FIG. 47. This removes the inflated costs and causes the assignments to flow in the opposite direction, eliminating the reciprocal system.

If the final merge is performed, such that $\{s1,s2\} \rightarrow s$ and $\{t1,t2\} \rightarrow t$, then the graph shown at 2850 in FIG. 48 is obtained. A cycle still remains between s and t with no change in the original graph of FIG. 45, but the costs on the accounts and assignments are different and are interpreted in a different way.

The cost on the accounts is the same as the non-reciprocal incoming cost in the original graph. Assignments between the accounts are used to redistribute an account's cost to the outgoing account's outgoing cost. It is not flowed in a cycle back to the originating incoming account. As an example, the $24.97 out of s is flowed to t and then to v. None of the $24.97 is flowed back to s. The remainder ($100−24.97=75.03) is flowed directly to u.

This shows that cycles can still exist after reducing a reciprocal system but that the resulting cost flow is interpreted differently.

With this in mind, a cycle represents the physical structure of strongly connected components (which a reciprocal system refers) to one where the same costs repeatably flows through the system until a stable system is reached.

A use of the systems and methods described herein can be used to generate fact tables for reporting or in OLAP applications. It is noted that OLAP provides multidimensional, summarized views of business data and is used for reporting, analysis, modeling and planning for optimizing the business. By applying stage reduction, a graph can be created that can easily be converted into a fact table for storage in an OLAP database. Each cost flow path in the reduced cost flow model can be stored in a data record row in the OLAP database.

Figure 49:
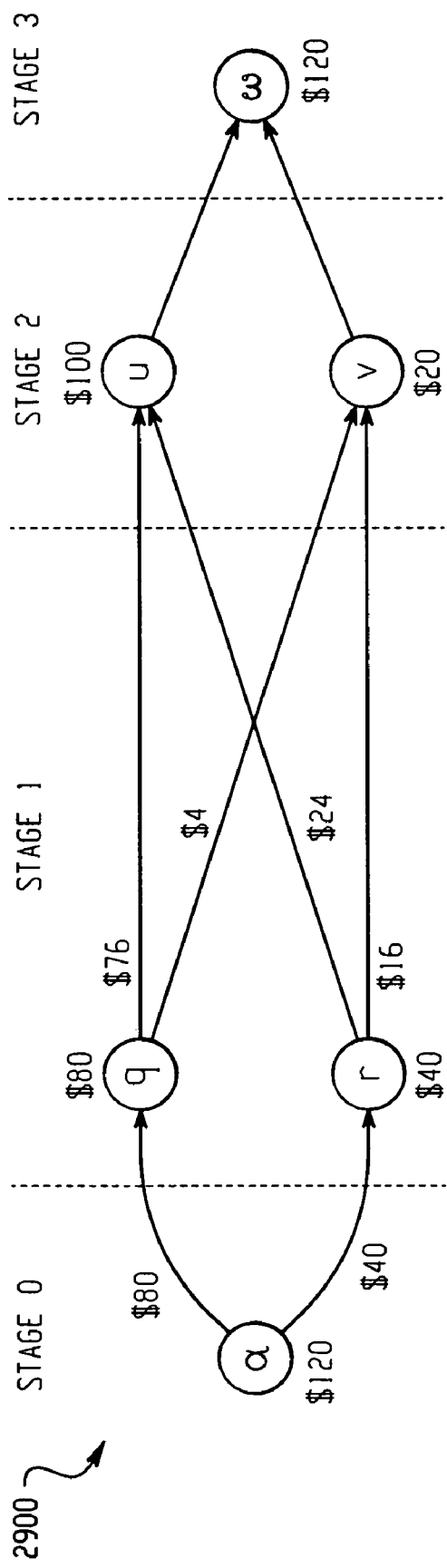

FIG. 49 shows a graph at 2900 after a stage reduction has been applied, and Table 4 below shows the resulting fact table. A fact table is made up of in this example of a single Cost column plus one column per stage from the graph. Each row in the table is a path in the graph and can be created using a depth-first search traversal. The cost is calculated as $$\text{cost}(\text{path}) = \text{cost}(\alpha) \cdot \prod_{i=1}^{n} \frac{\text{cost}(uv_i)}{\text{cost}(u)},$$

where $uv_i$ is the $i^{th}$ assignment in that path and u is the source account of $uv_i$. The Cost Formula in the table shows how this is applied for each row in the fact table.

TABLE 4

| Stage0 | Stage1 | Stage2 | Cost | (Cost Formula) |
|---|---|---|---|---|
| α | q | u | 76 | (120 × 80/120 × 76/80) |
| α | q | v | 4 | (120 × 80/120 × 4/80) |
| α | r | u | 24 | (120 × 40/120 × 24/40) |
| α | r | v | 16 | (120 × 40/120 × 16/40) |

The number of rows in the resulting fact table is the number of paths in the graph. By reducing the graph using other techniques such as account removal, merging accounts using dimension intersections, and removing stages, the resulting graph will have fewer accounts and assignments and therefore fewer paths. This can significantly reduce times related to generating fact tables by orders of magnitude.

FIG. 51 shows at 3000 a sample view of an OLAP cube that was created from a fact table generated from a reduced graph. In the model used there are 5 stages. Stages 1 and 5 were removed from the output. It comes from the graph shown in FIG. 15. The columns show dimension Stage_4_Parcel_DeliveryRegion. The rows show dimension Stage_2_Customer_ServiceActivities.

Figure 50:
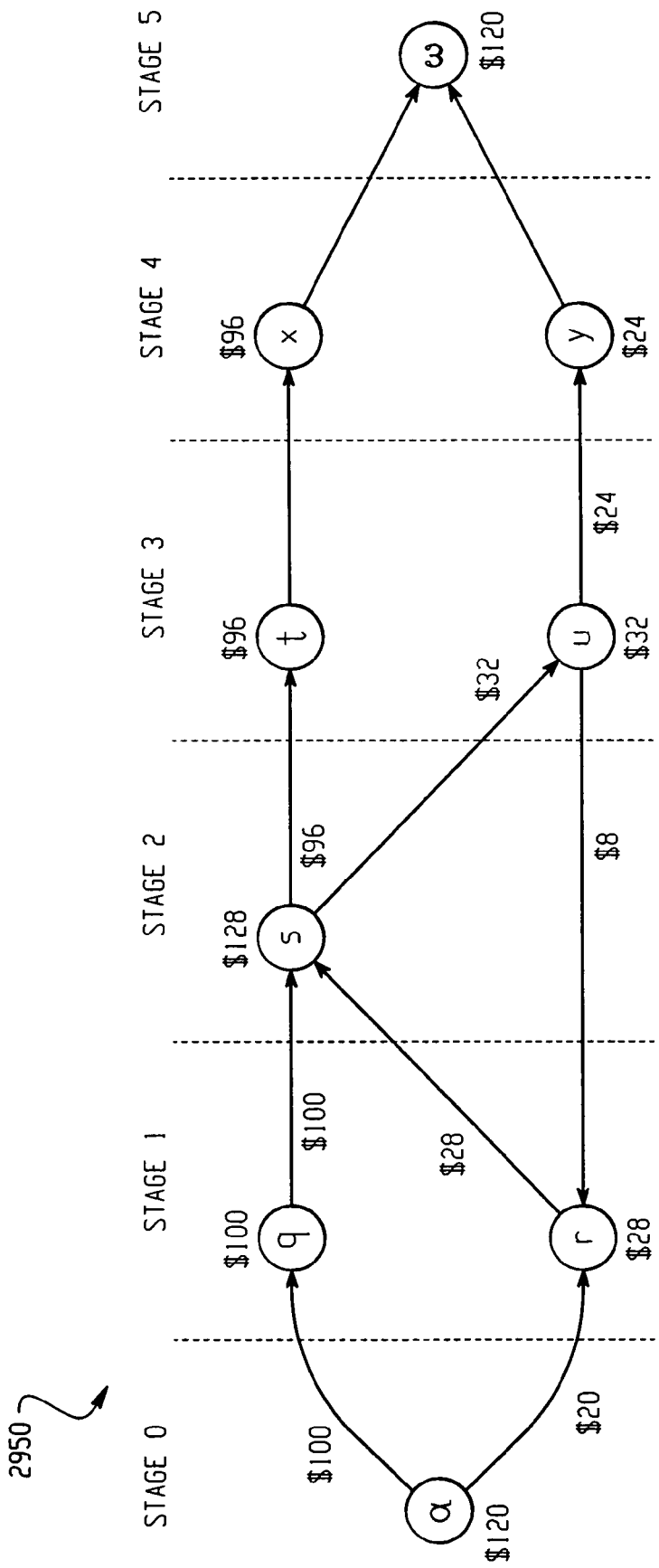

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, processing of reciprocal systems can be handled in different ways. With respect to evaluating flow in reciprocal systems, it was assumed that the flows have been evaluated for an ABM graph. A system of simultaneous equations (SSE) is used to evaluate the flow through a reciprocal system. The graph depicted at 2950 in FIG. 50 and Table 5 (below) will be used to illustrate how this can be done. Before the flow is evaluated for accounts in the reciprocal system which is made up of accounts r, s and u, the non-reciprocal incoming costs for each account in the reciprocal system is to be calculated. The percentages of the outgoing flows are also needed. (This percentage is readily available in an ABC graph by using the general formula $$\frac{DriverQuantity(uv)}{TotalDriverQuantity(u)},$$

though the actual details may vary slightly. DriverQuantity (uv) is user-defined in the graph.) These values are shown in Table 5. Note that t is included for illustration. t and its related assignment st could be removed from this without any effect on the solution.

TABLE 5

| | Incoming Non-Cyclic Costs | | Assignment Percentages |
|---|---|---|---|
| r | 100 | rs | 100% = 1.00 |
| s | 100 | st | 75% = 0.75 |
| t | 0 | su | 25% = 0.25 |
| u | 0 | ur | 25% = 0.25 |

The SEE is evaluated by using the formula Mx+b=0, where M is a matrix filled with the flow percentages, b is a vector containing the non-reciprocal costs and we are solving for x. The actual formula is then $x=-bM^{-1}$. M and b have the following values:

$$b = \begin{bmatrix} -100 \\ -100 \\ 0 \\ 0 \end{bmatrix}, M^{-1} = \begin{bmatrix} -1 & 0 & 0 & 0.25 \\ 1.00 & -1 & 0 & 0 \\ 0 & 0.75 & -1 & 0 \\ 0 & 0.25 & 0 & -1 \end{bmatrix}$$

b's rows are r, s, t, and u respectively, and contain the non-reciprocal incoming costs of those accounts. M's rows and columns are used to show the percentage flow between those same accounts, so the flow from s (column 2) to t (row 3) is 0.75. When the SSE is evaluated using b and $M^{-1}$ the following value results $$x = \begin{bmatrix} 28 \\ 128 \\ 96 \\ 32 \end{bmatrix}$$

The values are arranged in the same order as b and M, such that accounts r, s, t and u have the respective costs of 28, 128, 96 and 32.

To determine how an account's non-reciprocal incoming cost is distributed throughout the system, a cost of 1.0 is used in b while setting all other values to zero, and then flowed through using SSE as shown above. The resulting values in x are the percentages of the account's cost that flow to the other accounts.

It should be understood that other reciprocal costing approaches can be utilized in combination with one or more of the reduction techniques discussed herein. For example the reciprocal costing approaches disclosed in the following application can be used with one or more the reduction techniques discussed herein: U.S. patent application Ser. No. 11/370,371 (filed Mar. 8, 2006, entitled "Systems And Methods For Costing Reciprocal Relationships"), of which the entire disclosure (including any and all figures) is incorporated herein by reference. As an illustration, a reduction technique discussed herein may be used with a reciprocal costing method that is configured to account for reciprocal relationships without double counting. Direct costs are allocated among entities (wherein at least one of the entities has a reciprocal relationship with another of the entities). Indirect costs are reallocated among the entities without allocating the costs to an entity that had previously allocated or reallocated the cost. This is performed until the costs are reallocated to an entity that does not have any reciprocal relationships with any of the other entities, thereby producing an allocation of costs.

As another example of the wide scope of the systems and methods disclosed herein, there can be many different types of uses, such as faster processing of path-based algorithms, such as generating fact tables for reporting and OLAP analysis. This invention can reduce the number of paths by orders of magnitude. Once such case showed a decrease from $10^{15}$ to $10^9$ in the number of paths. Another example of a user can be for scenario analysis, where the graph is reduced to the key accounts of interest for analysis and what-if scenarios. Still another example relates to visualization, where the number of accounts is reduced to a reasonable number that can fit on a page of paper.

As yet another example of the wide scope of the systems and methods disclosed herein, the reduction techniques disclosed herein could assist in converting the cost flow graph into a format that can be more easily be used within a regular rectangular data format, such as within a relational database management systems (RDBMS), multi-dimensional database systems (MDDB) (e.g., Online Analytical Processing (OLAP) tools), etc. As an illustration, a column within a table can store information about a stage in a cost flow graph. Each record within the table could store a cost flow path associated with a stage. Reduction techniques (e.g., stage reduction techniques, account merging techniques) described herein can reduce a graph such that each stage has for a given path only one node (or no nodes). This removes the wide variation in path lengths/traversals that might occur in an unreduced graph. With a reduced graph, a table can then have one column for each stage because a stage would have only one node (or no nodes) for a particular path.

FIGS. 11, 13, and 15 illustrate this. For example, in FIG. 15, there is only one stage 2 node for the path associated with node 520. Similarly, there is only one stage 4 node for the paths associated with node 540. This is in contrast with the cost flow graph of FIG. 8 wherein a single path can contain multiple nodes that are from the same stage (e.g., multiple stage 3 nodes (i.e., nodes 530, 534, 536) exist along a single cost flow path). The information associated with FIGS. 11, 13, and 15 is thus easier to store in a rectangular format because there is only one node per stage for each cost flow path and there is less information to store because of the graph reductions performed for FIGS. 11, 13, and 15.

Figure 52:
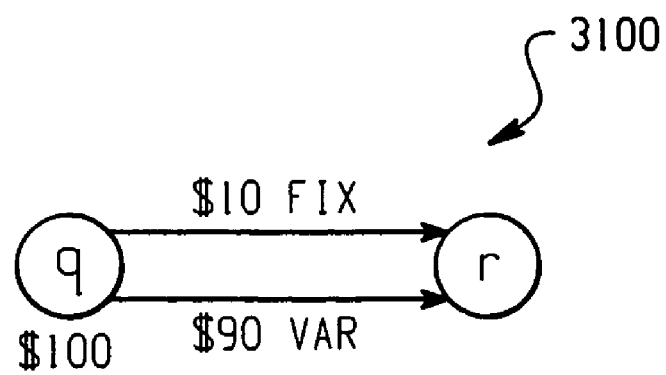
FIGS. 52 and 53 are cost flow model graphs wherein assignments have been reduced.

As another example of the wide scope of the systems and methods disclosed herein, a system and method can be configured to, in addition to or in place of the reductions described herein, consolidate an assignment (relationship), where multiple assignments exist between two accounts as shown at 3100 in FIG. 52. Consolidation includes combining the assignments into one and adding their costs together. (This can occur as part of the other reduction steps, but is assumed to always be done.)

Figure 53:
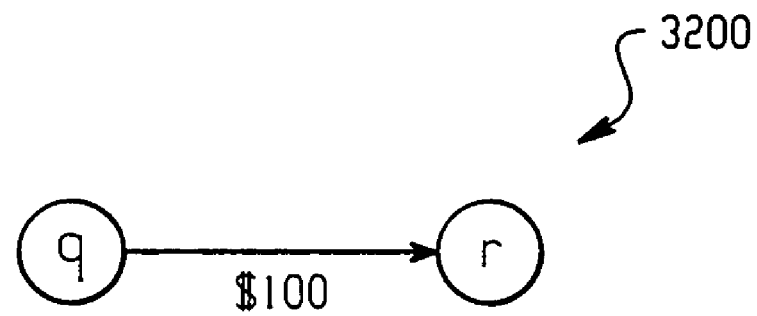

For example, if fixed and variable costs are flowed separately in the primary model but we only want the total cost in the reduced model then we can sum the two together to just have the total cost in the final model, such as the model shown at 3200 in FIG. 53 that is a consolidation of the model in FIG. 52.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the steps described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for analyzing costs associated with cost flow models having components of relationships and entities, the method comprising:
receiving, using one or more computer processors, data associated with a first cost flow model that identifies the costs associated with relationships among the entities, including resources, activities, and cost objects, wherein the first cost flow model is a multi-dimensional directed graph for depicting how money flows in an enterprise, wherein nodes of the graph represent accounts associated with the resources, activities, or cost objects, wherein an account exists at the intersection of a plurality of dimension members within a multi-dimensional database (MDDB) having dimensions, each dimension containing one or more dimension members, and wherein an edge of the multi-dimensional directed graph is associated with a percentage defining how much money flows from a source account to a destination account;

receiving reduction criteria, and using the reduction criteria to reduce the number of components in the first cost flow model;

using the reduction criteria to generate a reduced cost flow model, wherein the reduced cost flow model has fewer components than the number of components that are in the received first cost flow model, and wherein the reduced cost flow model is used to analyze costs associated with the entities in the reduced cost flow model; and processing and storing the reduced cost flow model, wherein computation processing and storage requirements associated with processing and storing the reduced cost flow model is less than computation processing and storage requirements associated with processing and storing the first cost flow model, wherein the storing of the reduced cost flow model includes storing the reduced cost flow model in a relational database management system (RDBMS) or an Online Analytical Processing (OLAP) database, and wherein each cost flow path in the reduced cost flow model is stored in a data record row in a table in the RDBMS or the OLAP database.

2. The method of claim 1, wherein the first and reduced cost flow models are activity-based costing flow graphs.

3. The method of claim 1, wherein the first cost flow model depicts how money flows in the enterprise, starting from the resources to the activities, and finally, to the cost objects.

4. The method of claim 1, wherein the resources represent accounts in a general ledger, and wherein the cost objects represent products or services provided by the enterprise.

5. The method of claim 4, wherein a cost object account exists at an intersection of a product or service dimension and a customer dimension.

6. The method of claim 5, wherein the first cost flow model is a multi-dimensional directed graph that includes over 100,000 accounts and over 1,000,000 edges, and wherein the reduced cost flow model is a multi-dimensional directed graph that contains less than 100,000 accounts and less than 1,000,000 edges.

7. The method of claim 1, wherein the reduced cost flow model includes a first account and a second account, and wherein the reduced cost flow model is used to analyze how much money the first account contributed to the second account.

8. The method of claim 1, wherein the cost flows in the first cost flow model are preserved in the reduced cost flow model.

9. The method of claim 8, wherein preserving the cost flows for the entities in the reduced cost flow model indicates that the starting cost of the reduced cost flow model is the same cost as the end cost for the reduced cost flow model, and wherein preserving the cost flows for the entities in the reduced cost flow model indicates that when removing or merging accounts, the cost for the reduced cost flow model does not change.

10. The method of claim 1, wherein the reduction criteria includes criteria related to which of the entities to remove from the first cost flow model when generating the reduced cost flow model.

11. The method of claim 1, wherein the reduction criteria includes criteria related to which of the entities from the first cost flow model to merge when generating the reduced cost flow model.

12. The method of claim 1, wherein at least two of the entities comprise accounts associated with service departments.

13. The method of claim 12, wherein at least one of the service departments comprises a human resources department, an information technology department, a maintenance department, or an administrative department.

14. The method of claim 1, wherein the reduced cost flow model is used to determine allocation of costs for the entities in the reduced cost flow model, thereby allowing a user to establish a cost associated with operating each of the entities in the reduced cost flow model.

15. The method of claim 14, wherein the allocation of costs comprises at least one of budgeting, allocating expenses, allocating revenues, allocating profits, assigning capital, and combinations thereof.

16. The method of claim 1, wherein the entities comprise cost pools.

17. The method of claim 16, wherein the cost pools include at least one of the group consisting of organizational cost pools, activity-based cost pools, or process-based cost pools, other logical groupings of money, and combinations thereof.

18. The method of claim 1, wherein the reducing the number of components that are in the first cost flow model includes reducing the number of entities that are in the first cost flow model.

19. The method of claim 1, wherein the reducing the number of components that are in the first cost flow model includes reducing the number of entities and relationships that are in the first cost flow model.

20. The method of claim 1, wherein the reducing the number of components that are in the first cost flow model includes reducing the number of relationships that are in the first cost flow model.

21. The method of claim 1, wherein reducing the first cost flow model to generate the reduced cost flow model results in each cost flow path of the reduced cost flow model having one or no nodes per stage, and wherein the table contains one column for each stage.

22. Computer software stored on one or more computer readable mediums, the computer software comprising program code, when executed by a computer for carrying out a method for analyzing costs associated with cost flow models having components of relationships and entities, the method comprising:

receiving, using one or more computer processors, data associated with a first cost flow model that identifies the costs associated with relationships among the entities, including resources, activities, and cost objects, wherein the first cost flow model is a multi-dimensional directed graph for depicting how money flows in an enterprise, wherein nodes of the graph represent accounts associated with the resources, activities, or cost objects, wherein an account exists at the intersection of a plurality of dimension members within a multi-dimensional database (MDDB) having dimensions, each dimension containing one or more dimension members, and wherein an edge of the multi-dimensional directed graph is associated with a percentage defining how much money flows from a source account to a destination account;

receiving reduction criteria, and using the reduction criteria to reduce the number of components in the first cost flow model;

using the reduction criteria to generate a reduced cost flow model, wherein the reduced cost flow model has fewer components than the number of components that are in the received first cost flow model, and wherein the reduced cost flow model is used to analyze costs associated with the entities in the reduced cost flow model; and processing and storing the reduced cost flow model, wherein computation processing and storage requirements associated with processing and storing the reduced cost flow model is less than computation processing and storage requirements associated with processing and storing the first cost flow model, wherein the storing of the reduced cost flow model includes storing the reduced cost flow model in a relational database management system (RDBMS) or an Online Analytical Processing (OLAP) database, and wherein each cost flow path in the reduced cost flow model is stored in a data record row in a table in the RDBMS or the OLAP database.

23. A system for analyzing costs associated with cost flow models having components of relationships and entities, comprising:

one or more processors;

a computer-readable storage medium containing software instructions executable on the one or more processors to cause the one or more processors to perform operations including:

receiving data associated with a first cost flow model that identifies the costs associated with relationships among the entities, including resources, activities, and cost objects, wherein the first cost flow model is a multi-dimensional directed graph for depicting how money flows in an enterprise, wherein nodes of the graph represent accounts associated with the resources, activities, or cost objects, wherein an account exists at the intersection of a plurality of dimension members within a multi-dimensional database (MDDB) having dimensions, each dimension containing one or more dimension members, and wherein an edge of the multi-dimensional directed graph is associated with a percentage defining how much money flows from a source account to a destination account;

receiving reduction criteria, and using the reduction criteria to reduce the number of components in the first cost flow model;

using the reduction criteria to generate a reduced cost flow model, wherein the reduced cost flow model has fewer components than the number of components that are in the received first cost flow model, and wherein the reduced cost flow model is used to analyze costs associated with the entities in the reduced cost flow model; and processing and storing the reduced cost flow model, wherein computation processing and storage requirements associated with processing and storing the reduced cost flow model is less than computation processing and storage requirements associated with processing and storing the first cost flow model, wherein the storing of the reduced cost flow model includes storing the reduced cost flow model in a relational database management system (RDBMS) or an Online Analytical Processing (OLAP) database, and wherein each cost flow path in the reduced cost flow model is stored in a data record row in a table in the RDBMS or the OLAP database.

24. A computer-readable storage medium encoded with instructions that when executed, cause a computer to perform a method for analyzing costs associated with cost flow models having components of relationships and entities, the method comprising:

receiving data associated with a first cost flow model that identifies the costs associated with relationships among the entities, including resources, activities, and cost objects, wherein the first cost flow model is a multi-dimensional directed graph for depicting how money flows in an enterprise, wherein nodes of the graph represent accounts associated with the resources, activities, or cost objects, wherein an account exists at the intersection of a plurality of dimension members within a multi-dimensional database (MDDB) having dimensions, each dimension containing one or more dimension members, and wherein an edge of the multi-dimensional directed graph is associated with a percentage defining how much money flows from a source account to a destination account;

receiving reduction criteria, and using the reduction criteria to reduce the number of components in the first cost flow model;

using the reduction criteria to generate a reduced cost flow model, wherein the reduced cost flow model has fewer components than the number of components that are in the received first cost flow model, and wherein the reduced cost flow model is used to analyze costs associated with the entities in the reduced cost flow model; and processing and storing the reduced cost flow model, wherein computation processing and storage requirements associated with processing and storing the reduced cost flow model is less than computation processing and storage requirements associated with processing and storing the first cost flow model, wherein the storing of the reduced cost flow model includes storing the reduced cost flow model in a relational database management system (RDBMS) or an Online Analytical Processing (OLAP) database, and wherein each cost flow path in the reduced cost flow model is stored in a data record row in a table in the RDBMS or the OLAP database.

* * * * *